(12) United States Patent
Cancilla et al.

(10) Patent No.: US 12,118,082 B1
(45) Date of Patent: Oct. 15, 2024

(54) AUTOMATED SCAN ENGINE ASSIGNMENT

(71) Applicant: Rapid7, Inc., Boston, MA (US)

(72) Inventors: James Cancilla, Milton (CA); Paul Miseiko, Mississauga (CA); Emmett Kelly, Belfast (GB)

(73) Assignee: Rapid7, Inc., Boston, MA (US)

( * ) Notice: Subject to any disclaimer, the term of this patent is extended or adjusted under 35 U.S.C. 154(b) by 378 days.

(21) Appl. No.: 17/588,413

(22) Filed: Jan. 31, 2022

Related U.S. Application Data

(63) Continuation-in-part of application No. 17/512,798, filed on Oct. 28, 2021, and a continuation-in-part of application No. 17/512,795, filed on Oct. 28, 2021.

(51) Int. Cl.
*H04L 9/40* (2022.01)
*G06F 21/55* (2013.01)

(52) U.S. Cl.
CPC ...... *G06F 21/554* (2013.01); *G06F 2221/034* (2013.01)

(58) Field of Classification Search
CPC .......................... G06F 21/554; G06F 2221/034
USPC .......................................................... 726/25
See application file for complete search history.

(56) References Cited

U.S. PATENT DOCUMENTS

| | | | | |
|---|---|---|---|---|
| 9,104,859 | B1 * | 8/2015 | Banerjee | H04L 63/1408 |
| 9,716,727 | B1 * | 7/2017 | Seger | H04L 63/1491 |
| 2010/0064362 | A1 * | 3/2010 | Materna | H04L 41/5058 |
| | | | | 726/15 |
| 2013/0268652 | A1 * | 10/2013 | Hugard, IV | H04W 4/38 |
| | | | | 709/224 |
| 2013/0269028 | A1 * | 10/2013 | Nakawatase | H04L 63/1433 |
| | | | | 726/22 |
| 2013/0275574 | A1 * | 10/2013 | Hugard, IV | H04L 63/10 |
| | | | | 709/224 |
| 2014/0181975 | A1 * | 6/2014 | Spernow | G06F 21/568 |
| | | | | 726/23 |
| 2014/0215624 | A1 * | 7/2014 | Suzio | G06F 21/554 |
| | | | | 726/23 |
| 2017/0019416 | A1 * | 1/2017 | Balcik | H04L 67/01 |
| 2017/0104780 | A1 * | 4/2017 | Zaffarano | H04L 63/20 |
| 2018/0053132 | A1 * | 2/2018 | Daugherty | G06Q 10/20 |
| 2018/0091558 | A1 * | 3/2018 | Daugherty | G06F 21/577 |
| 2019/0081942 | A1 * | 3/2019 | Suresh | H04L 63/0815 |
| 2020/0143051 | A1 * | 5/2020 | Zhao | G06F 21/556 |
| 2020/0287928 | A1 * | 9/2020 | Murray | G06F 21/577 |
| 2021/0258306 | A1 * | 8/2021 | Dowd | H04L 63/104 |
| 2023/0120174 | A1 * | 4/2023 | Seck | G06F 21/566 |
| | | | | 726/25 |
| 2023/0179607 | A1 * | 6/2023 | Kimayong | G06F 21/563 |
| | | | | 726/23 |

* cited by examiner

*Primary Examiner* — Thanh T Le
(74) *Attorney, Agent, or Firm* — Ashwin Anand; Lei Sun

(57) ABSTRACT

Various embodiments include systems and methods of automated scan engine assignment. Responsive to determining to initiate a scan of a target asset, a scan engine assignment strategy may be determined for automatically assigning one or more scan engines to perform the scan. Determining the scan engine assignment strategy may include implementing a strategy selection scheme that defines a hierarchy of scan engine assignment strategies, which may include at least one of a passive discovery strategy, an active discovery strategy, or a scan engine subnet strategy. Using the scan engine assignment strategy, the one or more scan engines may be automatically assigned to perform the scan. The scan may be performed using the one or more scan engines.

20 Claims, 13 Drawing Sheets

800

Receive a set of scheduling parameters, comprising a frequency corresponding to how often assessments are to be completed via a particular automated assessment and a type of assessment to perform in the particular automated assessment
810

Generate, based at least in part on the set of scheduling parameters, an assessment configuration comprising a set of attributes defining how the particular automated assessment is to be performed
820

Identify at least one scan engine resource of a set of scan engine resources for utilization in the particular automated assessment
830

Automatically initiate, based at least in part on the assessment configuration and using the at least one scan engine resource, the particular automated assessment
840

Responsive to determining to initiate a scan of a target asset, determine a scan engine assignment strategy for automatically assigning one or more scan engines to perform the scan. Determining the scan engine assignment strategy includes implementing a strategy selection scheme that defines a hierarchy of scan engine assignment strategies.
1410

Scan engine assignment strategies comprise at least one of:
(i) a passive discovery strategy that utilizes reachable target data from a plurality of scan engines to determine the scan engine(s) to perform the scan;
(ii) an active discovery strategy that utilizes output data from the plurality of scan engines to determine the scan engine(s) to perform the scan; or
(iii) a scan engine subnet strategy that utilizes subnet data to determine which of the plurality of scan engines are capable of scanning the target asset.
1412

Automatically assign, using the scan engine assignment strategy, the scan engine(s) to perform the scan
1420

Perform the scan using the assigned scan engine(s)
1430

FIG. 14

AUTOMATED SCAN ENGINE ASSIGNMENT

This application is a continuation-in-part of U.S. patent application Ser. No. 17/512,795, filed Oct. 28, 2021, and U.S. patent application Ser. No. 17/512,798, filed on Oct. 28, 2021, both of which are hereby incorporated by reference herein in their entirety.

BACKGROUND

Many companies operate private computer networks that are connected to public networks such as the Internet. While such connections allow its users to easily access resources on the public networks, they also expose the company network to potential cyberattacks. For example, company users may unwittingly download malicious content (e.g., data, files, applications, programs, etc.) onto the company network from the Internet. As another example, interactions between company users and outsiders on the public network may result in leaks of proprietary information to allow malicious actors to gain unauthorized access to the company network. Additionally, flaws or defects in the configuration (policy and/or compliance) and version (missing patches) of software could allow for the introduction of malware and/or the existence of an attack surface. Different types of cyberattacks can be used to achieve a variety of different ends, for example, to obtain sensitive information, gain control of the company's computing systems, or damage the company's resources. As a result, enterprise security management systems have become increasingly important to protect private company networks against these types of vulnerabilities. Typically, a company may utilize scheduled scans to manage the impact of scanning their networks and resources, to achieve scheduled informational cadence on their security posture, and to manage console and scan engine utilization. Such calendar-based scan scheduling can be time consuming and complex to configure and maintain. Accordingly, there is a need for improved systems and methods of managing assessment scheduling.

SUMMARY OF EMBODIMENTS

The systems and methods described herein may be employed in various combinations and in embodiments to implement automated assessment scheduling. The systems and methods of the present disclosure may provide numerous advantages over conventional calendar-based scan scheduling techniques, which can be time consuming and complex to configure and maintain. With the systems and methods of the present disclosure, a user can answer basic questions that define their scan scheduling preferences. In the present disclosure, an automated scheduler may then determine the appropriate utilization of available scan engine resources to accomplish the user's desired scan scheduling preferences. The systems and methods of the present disclosure may allow the user to achieve value from an assessment product faster, to utilize the product more efficiently, and to reduce the complexity associated with understanding and managing scan engine utilization. According to various embodiments, the systems and methods of the present disclosure may implement automated scan engine assignment.

BRIEF DESCRIPTION OF THE DRAWINGS

FIG. 8 is a diagram that illustrates an example of an automated assessment scheduling process, according to some embodiments.

FIG. 14 a flowchart that illustrates an example process of automated scan engine assignment, according to some embodiments.

Figure 1:
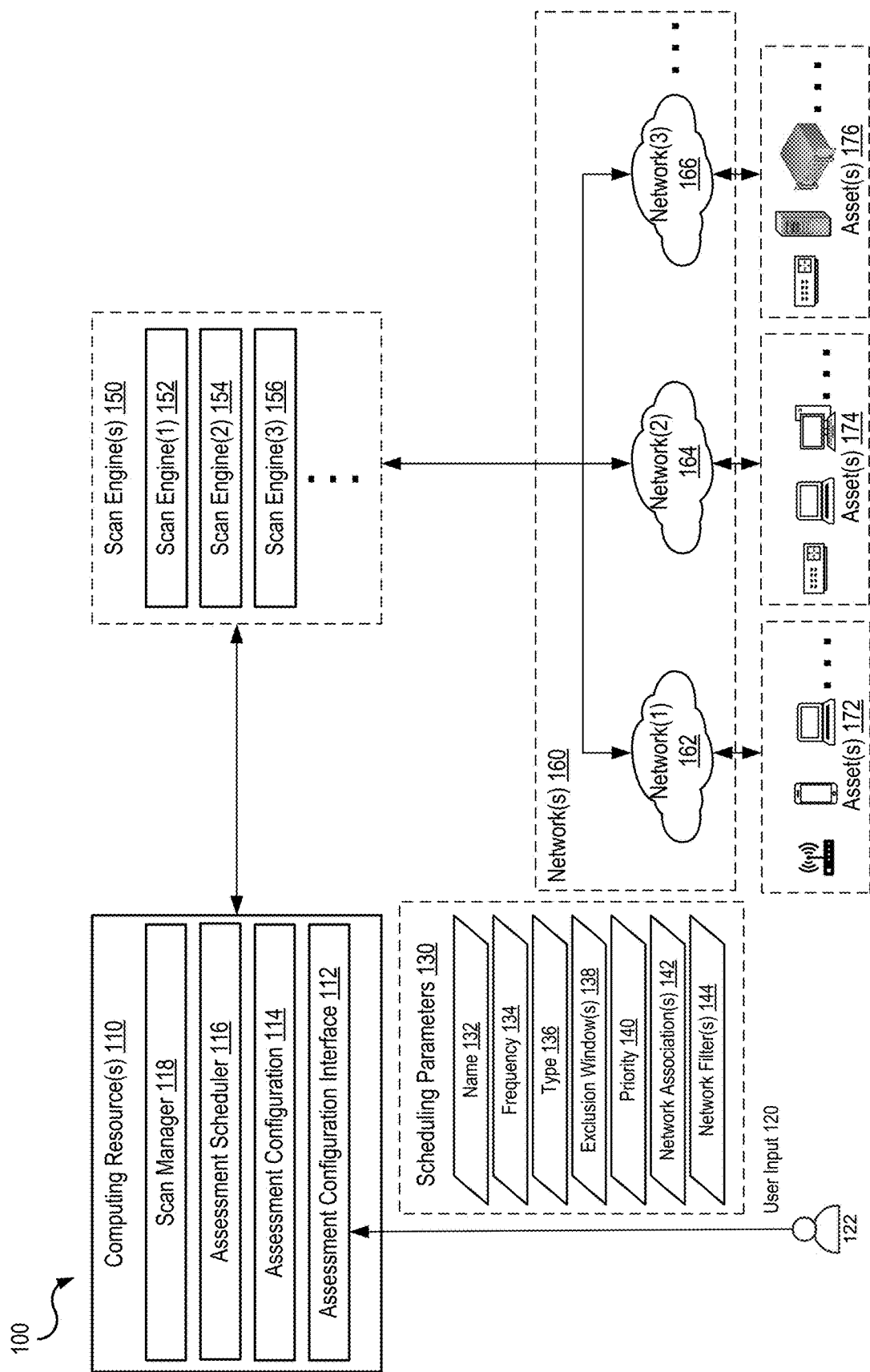
FIG. 1 is a block diagram illustrating an example system that implements automated assessment scheduling, in accordance with some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The present disclosure relates to systems and methods of automated assessment scheduling. The systems and methods of the present disclosure may provide numerous advantages over conventional calendar-based scan scheduling techniques, which can be time consuming and complex to configure and maintain. With the systems and methods of the present disclosure, a user can answer basic questions that define their scan scheduling preferences, such as: the frequency that networks and resources are to be scanned; when those networks and resources should not be scanned; what type of scan should be done against those networks and resources; and what scan engines can be used to scan those networks and resources. In the present disclosure, an automated scheduler may then determine the appropriate utilization of available scan engine resources to accomplish the user's desired scan scheduling preferences. The systems and methods of the present disclosure may allow the user to achieve value from a assessment product faster, to utilize the product more efficiently, and to reduce the complexity associated with understanding and managing scan engine utilization. Further, the systems and methods of the present disclosure may be utilized to implement automated scan engine assignment.

The systems and methods of the present disclosure may also provide the ability to identify when there are insufficient scan engine resources to accomplish desired scan scheduling preferences. In such cases, the user may be provided with feedback on whether or not additional resources are recommended as well as estimates on those additional resource recommendations. The systems and methods of the present disclosure may also provide the ability to identify over-provisioning of resources (that is, an excess number of scan engines). In such cases, the user may be provided with feedback to reduce the provisioned scan engine resources.

In the present disclosure, a user may be presented with a set of questions related to scan scheduling parameters. The answers to these questions may be utilized to automatically create scan schedules that satisfy the scan scheduling parameters described by the user. In some cases, for presentation to a user, the term "scan" may be substituted with the term "assessment" to qualify the action of assessing a network, resource, or asset, thereby simplifying terminology for the user as the term "scan" represents a means to achieve an ultimate goal of an assessment. It should be noted that when a schedule is configured, it might be a schedule against a network and not an asset and that as part of that schedule, the scan engine may discover live assets on the network. Furthermore, one or more live assets could be the same asset (e.g., a device with multiple IP addresses) on the same network, or on multiple networks such as one IP address on a first network and another IP address on a second network. Thus, some assessments could be of the network itself irrespective of "one or more assets of a particular network" and that assessment might be a combination of both discovering assets and assessing those assets even if the type of assessment is vulnerability or policy and not discovery, in some scenarios discovery might always be done. Furthermore, discovery assessment types might, by their nature, not have explicit assets to run against and instead discover assets available on the network.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to unnecessarily obscure aspects of the embodiments.

Referring to FIG. 1, a block diagram illustrates various components of an example system 100 that implements automated assessment scheduling, in accordance with some embodiments. The system 100 of FIG. 1 may simplify the management of complex assessment scheduling that includes multiple variables of consideration.

Figure 10:
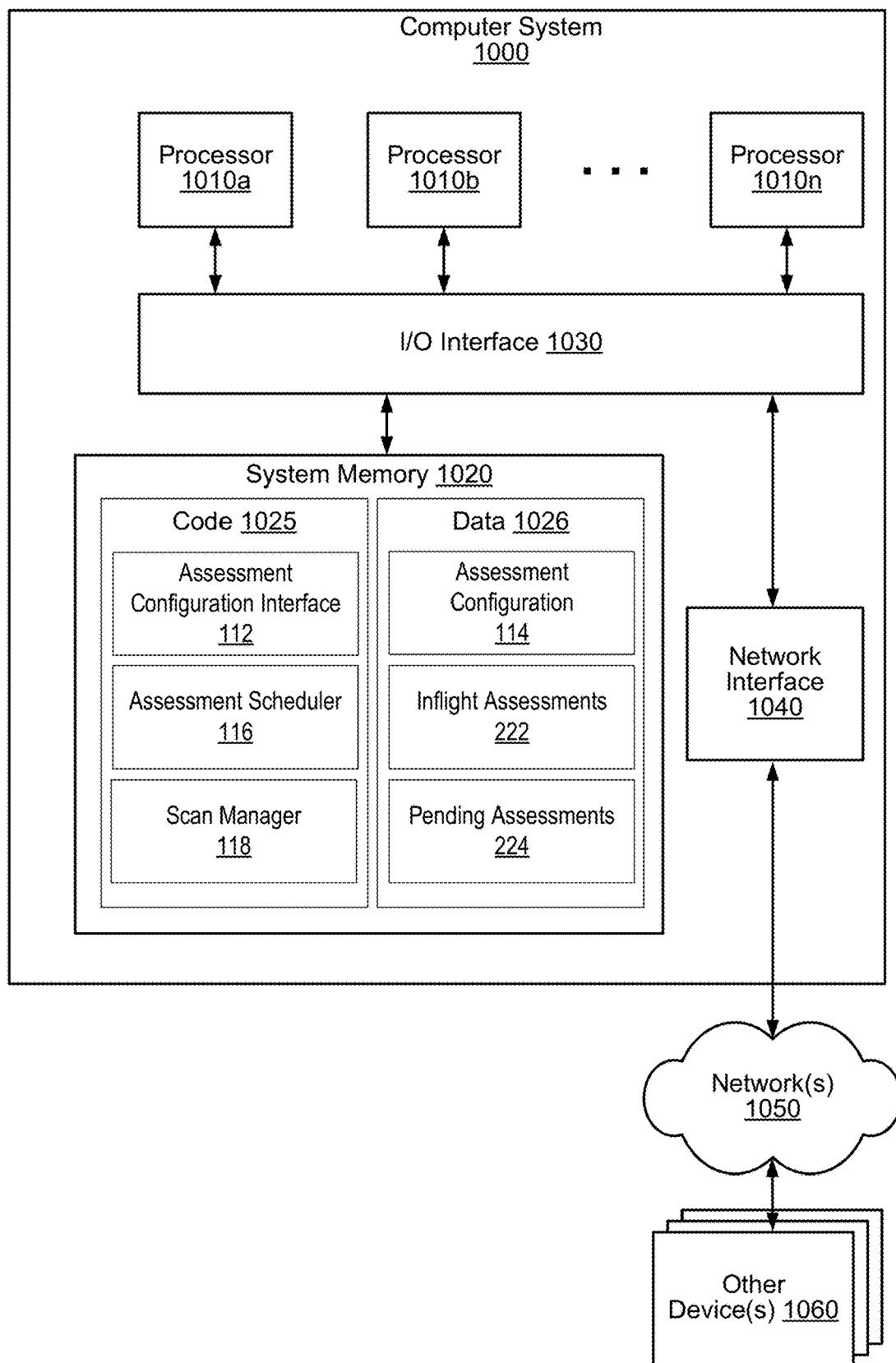
FIG. 10 is a block diagram illustrating an example computer system that may be used to implement one or more portions of a system that implements automated assessment scheduling, according to some embodiments.

FIG. 1 depicts one or more computing resources 110, which may include one or more hardware processors with associated memory (not shown, see e.g. FIG. 10). The computing resource(s) 110 may include one or more components that are configured to implement automated assessment scheduling, as described herein. In the embodiment depicted in FIG. 1, the computing resource(s) 110 include an assessment configuration interface 112, at least one assessment configuration 114, an assessment scheduler 116, and a scan manager 118. According to some embodiments, as further described herein with respect to FIGS. 11-14, the scan manager 118 depicted in FIG. 1 may include various sub-components to implement automated scan engine assignment.

According to various embodiments, the assessment configuration interface 112 may be configured to receive user input 120 from a user 122. The assessment configuration interface 112 may correspond to an application programming interface (API) or a graphical user interface (GUI), according to some embodiments. The user input 120 may include answers to a set of questions regarding particular scan scheduling requirements, and these answers may be utilized to automatically generate scan schedules that meet these scan scheduling requirements. A first example question in the set of questions may be related to how frequently the user 122 wants a given network, resource, or asset to be scanned. A second example in the set of questions may be related to what type of scan the user 122 wants performed against a given network, resource, or asset. Examples of types of scans may include discovery, vulnerability, or policy scanning, among other alternatives. A third example in the set of questions presented to the user 122 may be related to when a network, resource, or asset should not be scanned (also referred to herein as an "exclusion window"). A fourth example in the set of questions presented to the user 122 may be related to what scan engine resources can be utilized to scan a given network, resource, or asset. It will be appreciated that how such questions are presented to the user 122 via the assessment configuration interface 112 represent implementation details and that these questions could be presented to the user 122 as part of separate configuration phases. For example, scan engines could be assigned to networks, exclusion windows could be assigned to networks or could be assigned to both networks and scan configurations, while the scan type and frequency could be assigned to a scan configuration.

In the example depicted in FIG. 1, the user input 120 includes various scheduling parameters 130 that may be utilized to define various attributes of the assessment configuration 114. According to various embodiments, the scheduling parameters 130 received as part of the user input 120 may include one or more of: a name 132; a frequency 134; a type 136; one or more exclusion windows 138; a priority 140; one or more network associations 142; and one or more network filters 144.

The name 132 may be utilized to define a name attribute of the assessment configuration 114, where the name attribute corresponds to an assessment configuration name. The frequency 134 may be utilized to define a frequency attribute of the assessment configuration 114, where the frequency attribute corresponds to how often assessments are to be completed (also referred to herein as "scan cadence"). According to various embodiments, the frequency attribute may correspond to one of a daily scan cadence, a weekly scan cadence, or a monthly scan cadence, among other alternatives (e.g., semi-weekly, bi-weekly, semi-monthly, quarterly, etc.). In some cases, the frequency 134 could include relative start and stop dates, such as a weekly scan configured to start on a particular day (e.g., a Wednesday) of every week and to stop on another day (e.g., a Sunday). In some embodiments, the user input 120 may include an identification of a particular day that represents a start of a week (which may vary in different geographic locations).

The type 136 may be utilized to define a type attribute of the assessment configuration 114, where the type attribute corresponds to a particular type of assessment to be completed (also referred to herein as a "scan type"). According to various embodiments, the type attribute may correspond to a vulnerability assessment, a policy assessment, or a discovery assessment, among other alternatives.

The exclusion window(s) 138 may be utilized to define an exclusion window attribute of the assessment configuration 114, where the exclusion window attribute corresponds to when assessments are not to be performed (also referred to herein as a "blackout window"). Examples of exclusion windows may include a particular time of day (e.g., business hours), a particular day (or days) of a week, or a particular time (or times) of year (e.g., two weeks before a corporation's end of quarter), among numerous other alternatives.

According to some embodiments, the scheduling parameters 130 received as part of the user input 120 may include one or more inclusion windows (not shown in the example depicted in FIG. 1). Such inclusion window(s) may be utilized to define an inclusion window attribute of the assessment configuration 114, where the inclusion window attribute corresponds to when assessments are to be performed. That is, such an inclusion window attribute may represent the converse of the aforementioned exclusion window attribute of the assessment configuration 114.

The priority 140 may be utilized to define a priority attribute of the assessment configuration 114, where the priority attribute corresponds to a relative priority for how quickly an assessment is to be completed. According to various embodiments, the priority attribute may correspond to a low priority, a normal priority, or a high priority, among other alternatives.

The network association(s) 142 may be utilized to define a network associations attribute of the assessment configuration 114, where the network associations attribute corresponds to one or more networks to be assessed. The network filter(s) 144 may be utilized to define a network filters attribute of the assessment configuration 114, where the network filters attribute corresponds to one or more network filters to be applied to the network(s) to be assessed. Thus, the network association(s) 142 in combination with the network filter(s) 144 may be utilized to limit the scope of what is assessed on one or more identified networks by the assessment configuration 114.

The assessment scheduler 116 and the scan manager 118 may be configured to utilize the attributes of the assessment configuration 114 for automated assessment scheduling, as further described herein.

FIG. 1 illustrates that various components of the computing resource(s) 110 may be configured to communicate with a set of (one or more) scan engines 150 (also referred to herein as "scan engine resources"), which are devices that communicate with assets on a network to discover insights. In the particular embodiment depicted in FIG. 1, the set of scan engines 150 includes multiple engines, including at least a first scan engine 152, a second scan engine 154, and a third scan engine 156. Various operations may be performed by a particular scan engine, including: discovery of live assets within a network; fingerprinting what (network) services, software, configurations, operating system, and capabilities a live asset has and/or could/might/will provide within a network; and the assessment of live assets within a network, including but not limited to vulnerability and policy (compliance) assessments.

FIG. 1 further illustrates that the scan engine(s) 150 may be configured to communicate with a set of (one or more) networks 160. In the particular embodiment depicted in FIG. 1, the set of networks 160 includes multiple networks, including at least a first network 162, a second network 164, and a third network 166. An individual network may include one or more Internet Protocol (IP) addresses with assets on it that the user 122 wants insights for. For example, FIG. 1 illustrates that the first network 162 may include a first set of IP addresses associated with a first set of assets 172. As another example, FIG. 1 illustrates that the second network 164 may include a second set of IP addresses associated with a second set of assets 174. As yet another example, FIG. 1 illustrates that the third network 166 may include a third set of IP addresses associated with a third set of assets 176.

According to some embodiments, the assessment scheduler 116 in combination with the scan manager 118 may be configured to target distribution of assessments/scans based on scan engine load. To illustrate, when two or more scan engines of the set of scan engines 150 can scan a particular network node of the network(s) 160, the assessment scheduler 116 may be configured to assign one of the available scan engines to scan the particular network node. The particular network node may correspond to an IP address or a domain name within a particular network of the network(s) 160 in the example depicted in FIG. 1. That is, the particular network node may correspond to a subset of a particular network (e.g., a subset of one of the first network 162, the second network 164, or the third network 166). The assessment scheduler 116 may be configured to assign assessment task(s) to a particular scan engine of the set of scan engines 150 based on whether or not that particular scan engine is capable of executing more assessment tasks. As the particular scan engine has a finite amount of resources (e.g., CPU, memory, disk, etc.), the assessment scheduler 116 may be configured to avoid assigning additional assessment tasks to the particular scan engine if that scan engine does not have sufficient resources to service such additional assessment tasks.

A particular scan engine of the set of scan engines 150 may be capable of scanning multiple network nodes in parallel and each individual network node being scanned utilizes some amount of resources of the scan engine to service. According to some embodiments, one algorithm may involve dividing available resources by an average amount of resources associated with scanning an individual network node to determine a maximum number of network nodes that a particular scan engine may be able to service. In some cases, this algorithm may be ineffective, and in some cases the particular scan engine may exhaust its memory resources while performing assessment task(s). When the particular scan engine exhausts its memory resources, information about the network node(s) being scanned may be provided as feedback to the assessment scheduler 116 to mitigate the potential for future memory exhaustion issues by assigning weights to those particular network node(s). For example, in some cases scanning a Windows® domain controller may involve utilizing more resources relative to a Windows® workstation. Therefore, a higher "weight" may be associated with scanning a Windows® domain controller as part of an evaluation regarding whether a particular scan engine has sufficient available resources to perform the assessment task(s). In this example, a "weight" may represent a percentage multiplier of resources to be utilized for scanning a particular network node relative to an average of resources for scanning of network nodes. In some cases, this could be a positive weight (e.g., greater than 100 percent) or a negative weight (e.g., less than 100 percent).

According to some embodiments, the "weight" of a particular network node could be further influenced by a particular type of scan that the assessment scheduler 116 has identified to perform against that particular network node. To illustrate, a vulnerability scan without credentials (also referred to as an "unauthenticated" scan) could have a relatively low weight due to restricted access that reduces the amount of collectable information about that network node. By contrast, a vulnerability scan with credentials (also referred to as an "authenticated" scan) could have a relatively high weight due to access that allows a more comprehensive collection of information about that network node. In such cases, if a "high weight" network node is pending alongside one or more "low weight" network nodes, the assessment scheduler 116 may be configured to mitigate the potential for the "low weight" network node(s) to "starve" the "high weight" network node of scan engine resources to perform assessment task(s) on the "high weight" network node. That is, according to some embodiments, the assessment scheduler 116 may be configured to determine whether to instruct a scan engine to initiate assessment task(s) on "low weight" network nodes or to wait to initiate assessment task(s) until enough scan engine resources are available to service a "high weight" network node. In some embodiments, the assessment scheduler 116 may be configured to evaluate historical scan times associated with "inflight" network nodes (as described further herein with respect to FIG. 2, as an example) to identify a particular scan engine of the set of scan engines 150 to be assigned to perform assessment task(s) on the "high weight" network node. Additionally, in some embodiments, the assessment scheduler 116 may be configured to determine whether or not a particular scan engine of the set of scan engines 150 is capable of servicing a "high weight" network node. That is, the assessment scheduler 116 may be configured to determine whether the particular scan engine has enough total resources (if all resources are available) to service the "high weight" network node.

According to some embodiments, with automated scan schedules according to the present disclosure, the user 122 may no longer provide an explicit date or time for when to begin an assessment/scan. As described herein, the automated scan schedules of the present disclosure may utilize information provided by the user 122, such as how often a scan is to be performed, the particular type of scan to be performed, whether particular assets are to be scanned or not, and particular scan engine resources to be utilized. A typical workflow involves the ability to report scan results on a regular basis. Automated scan schedules according to the present disclosure may improve the overall experience of scheduling scans but may not address the "freshness" of the data relative to when the user 122 seeks to have a report on the results. To illustrate, the user 122 may desire for a scan to run monthly and to have a report of the associated scan results on the first day of the next month. In this example, the earlier in the month that the scans/assessments are actually performed, the more outdated that data is by the time the results are to be reported. Accordingly, in some embodiments, the assessment scheduler 116 may be configured to schedule a scan/assessment such that the scan/assessment is able to finish as close to a desired reporting date as possible. The systems and methods of the present disclosure may address this problem by using historical scan/assessment times (as described further herein with respect to FIG. 2, as an example) for a given scan in order to build a model to identify a particular start time for a scan/assessment so that the scan/assessment is capable of being completed as close to an end of the scan window as possible. Thus, according to some embodiments, the assessment scheduler 116 may be configured to generate automated scan schedules that are designed to identify a particular time to start a scan so that the resulting data is as fresh as possible at a time that a report of the results is to be utilized and/or acted upon by the user 122.

Thus, FIG. 1 illustrates that the system 100 may be utilized to implement automated assessment scheduling, which may simplify the management of complex assessment scheduling that includes multiple variables of consideration. In FIG. 1, the user 122 may answer basic questions that define their scan scheduling preferences, and the system 100 may then determine the appropriate utilization of available scan engine resources to accomplish the user's desired scan scheduling preferences. As described herein, the system 100 of FIG. 1 may allow the user 122 to achieve value from a assessment product faster, to utilize the product more efficiently, and to reduce (or eliminate) the complexity associated with understanding and managing scan engine utilization.

Figure 2:
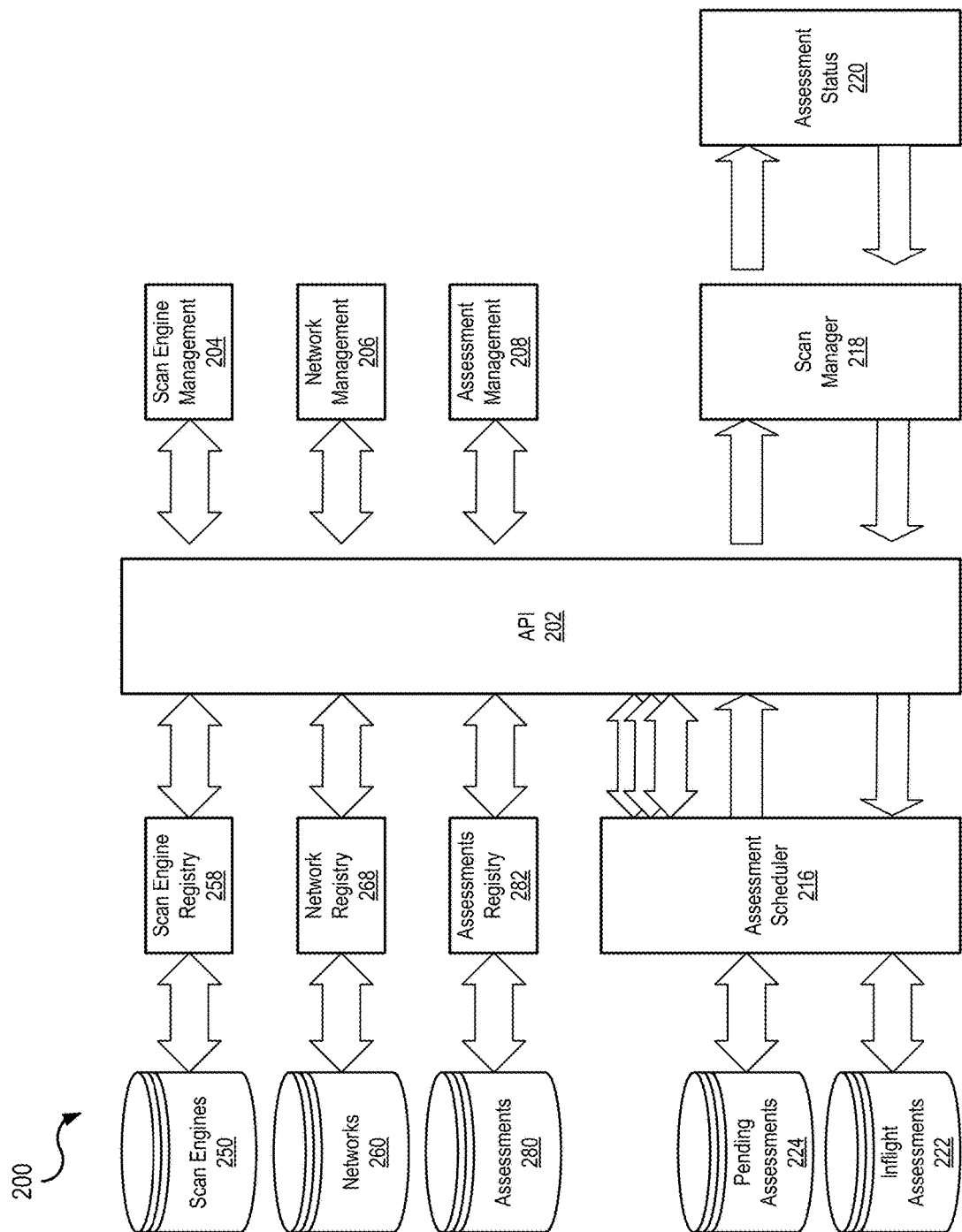
FIG. 2 is a block diagram illustrating an example automated assessment scheduling architecture, in accordance with some embodiments.

Referring to FIG. 2, a block diagram 200 illustrates an example automated assessment scheduling architecture, according to various embodiments.

FIG. 2 illustrates that an application programming interface (API) 202 may be utilized for scan engine management 204, network management 206, and assessment management 208, according to some embodiments. FIG. 2 further illustrates that the API 202 may be utilized by an assessment scheduler 216 and a scan manager 218. According to some embodiments, the assessment scheduler 216 of FIG. 2 may correspond to the assessment scheduler 116 depicted in FIG. 1, and the scan manager 218 of FIG. 2 may correspond to the scan manager 118 depicted in FIG. 1.

The scan manager 218 may be configured to track an assessment status 220. The assessment status 220 may contain information regarding various attributes associated with an assessment status of individual assessments. According to some embodiments, various attributes associated with an assessment status of a particular assessment may include one or more of: a network attribute; a network node attribute; a scan engine attribute; a credentials attribute; a reason attribute; a priority attribute; a pending attribute; and an inflight attribute. The network attribute may correspond to a network associated with the particular assessment. The network node attribute may correspond to the IP address or domain name associated with the particular assessment. The scan engine attribute may correspond to a scan engine assigned to the particular assessment. The credentials attribute may correspond to credentials associated with the particular assessment. The reason attribute may correspond to a reason for the particular assessment (e.g., ad-hoc, scheduled, remediation, tag, etc.). The priority attribute may correspond to how quickly a user seeks to have the particular assessment completed (e.g., low priority, normal priority, high priority, etc.). The pending attribute may correspond to whether or not the particular assessment is pending. The inflight attribute may correspond to whether or not the particular assessment is inflight.

According to some embodiments, the assessment status 220 may contain additional information regarding various attributes associated with assessment statuses. According to some embodiments, various attributes associated with the assessment statuses may include one or more of: a pending networks attribute; an inflight networks attribute; a pending network nodes attribute; an inflight network nodes attribute; a pending reason attribute; and an inflight reason attribute. The pending networks attribute may correspond to networks with pending assessment statuses. The inflight networks attribute may correspond to networks with inflight assessment statuses. The pending network nodes attribute may correspond to network nodes with pending assessment statuses (e.g., IP addresses or domain names). The inflight network nodes attribute may correspond to network nodes with inflight assessment statuses (e.g., IP addresses or domain names). The pending reason attribute may correspond to a reason (e.g., ad-hoc, scheduled, remediation, tag, etc.) associated with pending assessment statuses. The inflight reason attribute may correspond to a reason (e.g., ad-hoc, scheduled, remediation, tag, etc.) associated with inflight assessment statuses.

The assessment scheduler 216 may utilize the assessment status 220 (e.g., at least pending/inflight status information) received from the scan manager 218 to store data related to one or more inflight assessments 222 and to store data related to one or more pending assessments 224. An example of utilization of the data related to inflight assessments 222 and the pending assessments 224 are further described herein with respect to the example process of automated assessment scheduling depicted in FIG. 3.

With respect to the scan engine management 204, FIG. 2 illustrates that the API 202 may be utilized to manage data related to one or more scan engines 250 (e.g., via a scan engine registry 258). According to some embodiments, the data related to the one or more scan engines 250 may correspond to data related to the set of one or more scan engines 150 depicted in FIG. 1 (e.g., data related to at least the first scan engine 152, the second scan engine 154, and the third scan engine 156).

With respect to the network management 206, FIG. 2 illustrates that the API 202 may be utilized to manage data related to one or more networks 260 (e.g., via a network registry 268). According to some embodiments, the data related to the one or more networks 260 may correspond to data related to the one or more networks 160 depicted in FIG. 1 (e.g., data related to at least the first network 162, the second network 164, and the third network 166).

The data related to the one or more networks 260 may correspond to information regarding various attributes associated with each individual network. According to some embodiments, various attributes associated with a particular network may include one or more of: a name; a parent network; an owner; a domain; a subdomain; IP address(es); domain name(s); domain name system (DNS) server(s); dynamic host configuration protocol (DHCP) server(s); router(s); and a public/private attribute. The name attribute may correspond to a network name associated with the particular network. The parent network attribute may correspond to a parent network associated with the particular network. The owner attribute may correspond to a person responsible for the particular network. The domain attribute may correspond to an automatic correlation of devices found to be a member of a particular domain (e.g., rapid7.com). The subdomain attribute may correspond to an automatic correlation of devices found to be a member of a particular subdomain (e.g., tor.rapid7.com; yyz.rapid7.com; etc.). The IP address(es) attribute may correspond to one or more IP addresses associated with the particular network. The domain name(s) attribute may correspond to one or more domain names associated with the particular network. This information can be represented as: one or more individual IP addresses; one or more IP ranges; or one or more individual IP CIDR (classless inter-domain routing) values. The DNS server(s) attribute may correspond to one or more DNS servers associated with the particular network (e.g., the IP and MAC addresses if applicable). The DHCP server(s) attribute may correspond to one or more DHCP servers associated with the particular network (e.g., the IP and MAC addresses if applicable). The router(s) attribute may correspond to one or more routers associated with the particular network (e.g., the IP and MAC addresses if applicable). The public/private attribute may correspond to whether or not the particular network is public or private (where a public network can be scanned with a hosted scan engine). In addition to identifying whether the particular network can be scanned with a hosted scan engine, the public/private attribute may optionally be utilized to further classify risk (e.g., assets on a public network might have a higher risk versus assets on a private network, in some cases).

With respect to the assessment management 208, FIG. 2 illustrates that the API 202 may be utilized to manage data related to one or more assessments 280 (e.g., via an assessment registry 282).

According to some embodiments, the assessment scheduler 216 and/or the scan manager 218 may be configured to access, via the API 202, the scan engine registry 258 to retrieve selected information associated with at least one scan engine from the data related to the one or more scan engines 250. According to some embodiments, the assessment scheduler 216 and/or the scan manager 218 may be configured to access, via the API 202, the network registry 268 to retrieve selected information associated with at least one network from the data related to the one or more networks 260. According to some embodiments, the assessment scheduler 216 and/or the scan manager 218 may be configured to access, via the API 202, the assessment registry 282 to retrieve selected information associated with at least one assessment from the data related to the one or more assessments 280.

Thus, the automated assessment scheduling architecture depicted in the example of FIG. 2 may be utilized to implement automated assessment scheduling according to the present disclosure, which may simplify the management of complex assessment scheduling that includes multiple variables of consideration.

Figure 3:
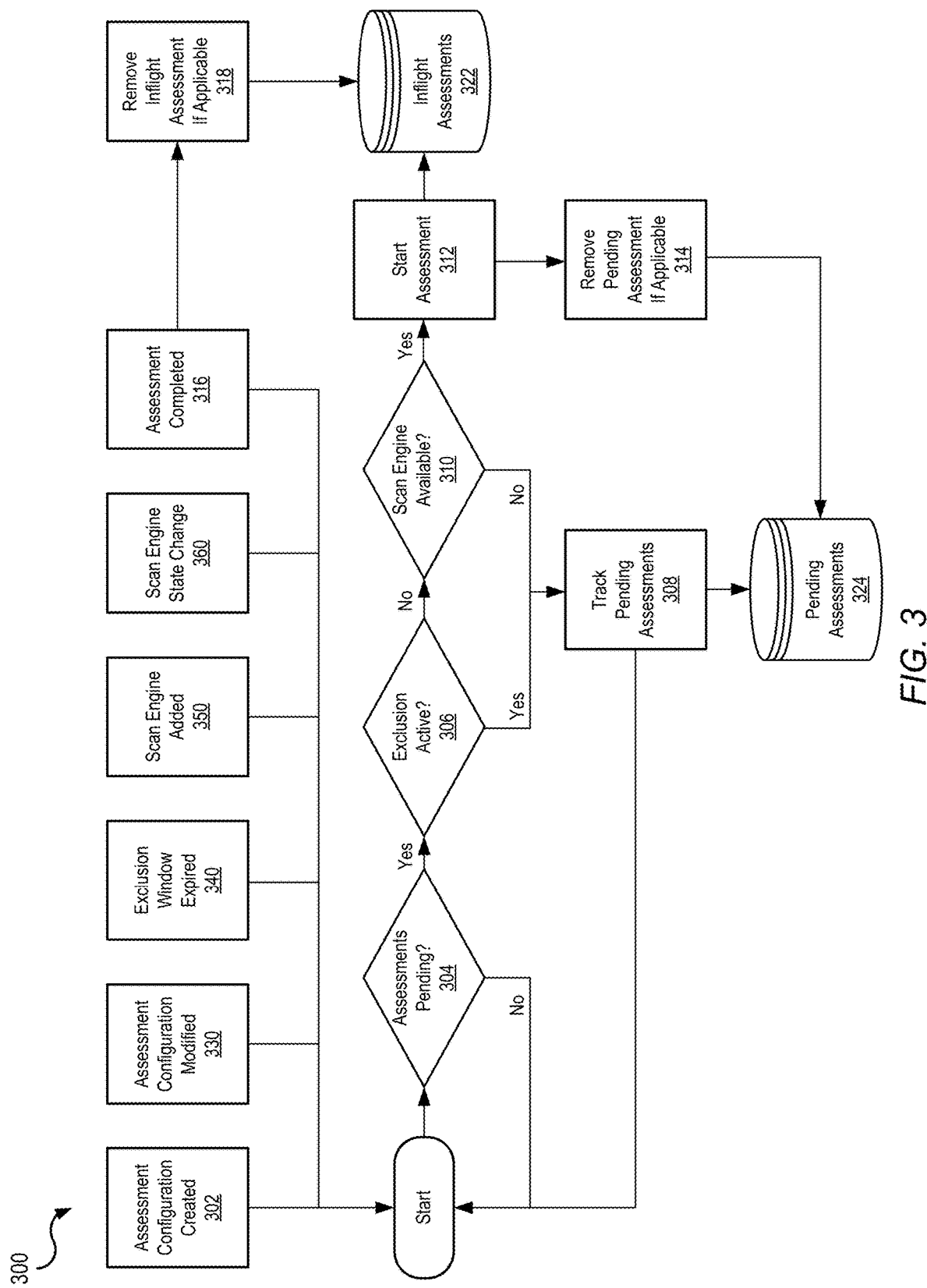
FIG. 3 is a block diagram illustrating an example process of automated assessment scheduling, in accordance with some embodiments.

Referring to FIG. 3, a block diagram 300 illustrates an example process of automated assessment scheduling, according to various embodiments.

According to some embodiments, FIG. 3 illustrates that the process of automated assessment scheduling may start responsive to creation of an assessment configuration, at operation 302. For example, the process of automated assessment scheduling may start responsive to creation of the assessment configuration 114 of FIG. 1.

At operation 304, FIG. 3 illustrates that the process of automated assessment scheduling may include determining whether one or more assessments are pending. For example, FIG. 3 illustrates data related to one or more pending assessments 324, which may be utilized to determine whether there are assessments that are pending. According to some embodiments, the data related to one or more pending assessments 324 depicted in FIG. 3 may correspond to the data related to one or more pending assessments 224 of FIG. 2. Upon determining that there are pending assessment(s), the process of automated assessment scheduling may proceed to operation 306. When there are no pending assessments, the process of automated assessment scheduling may return to start.

At operation 306, FIG. 3 illustrates that the process of automated assessment scheduling may include determining whether an exclusion is active. For example, the determination may be based on the exclusion window(s) 138 of the scheduling parameters 130 received as part of the user input 120, as depicted in FIG. 1. As previously described herein with respect to FIG. 1, the exclusion window(s) 138 may be utilized to define an exclusion window attribute of the assessment configuration 114, where the exclusion window attribute corresponds to when assessments are not to be performed. Upon determining that an exclusion is active, the process of automated assessment scheduling may proceed to operation 308. Upon determining that the exclusion is active, the process of automated assessment scheduling may proceed to operation 310.

At operation 308, FIG. 3 illustrates that the process of automated assessment scheduling may include tracking pending assessments. For example, FIG. 3 illustrates that tracking pending assessments may include accessing/updating the data related to one or more pending assessments 324. The process of automated assessment scheduling may then return to start.

At operation 310, FIG. 3 illustrates that the process of automated assessment scheduling may include determining whether at least one scan engine is available. In some cases, such an availability determination may be as simple as determining whether or not a scan engine exists for a particular network. In other cases, such an availability determination may be more complex, such as being based in whole or in part on a "weight" of a particular network node (e.g., "high" versus "low" weight, as previously described herein), among other alternatives. Upon determining that the scan engine(s) are available, the process of automated assessment scheduling may proceed to operation 312. When the scan engine(s) are unavailable, the process of automated assessment scheduling may return to operation 308.

At operation 312, FIG. 3 illustrates that the process of automated assessment scheduling may include starting an assessment. Various examples of assessments are illustrated and further described herein with respect to FIGS. 5 to 7. FIG. 3 illustrates that, after starting the assessment, the process of automated assessment scheduling may include updating/accessing data related to one or more inflight assessments 322 (e.g., to identify the assessment as an inflight assessment). According to some embodiments, the data related to one or more inflight assessments 322 depicted in FIG. 3 may correspond to the data related to one or more inflight assessments 222 of FIG. 2.

FIG. 3 further illustrates that, after starting the assessment, the process of automated assessment scheduling may proceed to operation 314. At operation 314, FIG. 3 illustrates that the process of automated assessment scheduling may include removing a pending assessment (if applicable). For example, removing the pending assessment may include accessing/updating the data related to one or more pending assessments 324.

FIG. 3 illustrates that upon completion of the assessment, at operation 316, the process of automated assessment scheduling may proceed to operation 318. At operation 318, FIG. 3 illustrates that the process of automated assessment scheduling may include removing an inflight assessment (if applicable). For example, removing the inflight assessment may include accessing/updating the data related to one or more inflight assessments 322 (e.g., to identify the assessment as no longer being an inflight assessment).

According to some embodiments, FIG. 3 illustrates that the process of automated assessment scheduling may start responsive to modification of an assessment configuration, at operation 330. For example, the process of automated assessment scheduling may start responsive to modification of the assessment configuration 114 of FIG. 1.

According to some embodiments, FIG. 3 illustrates that the process of automated assessment scheduling may start responsive to determining that an exclusion window has expired, at operation 340. For example, the determination may be based on the exclusion window(s) 138 of the scheduling parameters 130 received as part of the user input 120, as depicted in FIG. 1. As previously described herein with respect to FIG. 1, the exclusion window(s) 138 may be utilized to define an exclusion window attribute of the assessment configuration 114, where the exclusion window attribute corresponds to when assessments are not to be performed.

According to some embodiments, FIG. 3 illustrates that the process of automated assessment scheduling may start responsive to a scan engine being added, at operation 350. For example, referring to FIG. 2, the process of automated assessment scheduling may start responsive to the assessment scheduler 216 receiving information from the scan manager 218 that is indicative of a scan engine being added.

According to some embodiments, FIG. 3 illustrates that the process of automated assessment scheduling may start responsive to a scan engine state change, at operation 360. For example, referring to FIG. 2, the process of automated assessment scheduling may start responsive to the assessment scheduler 216 receiving information from the scan manager 218 that is indicative of a scan engine state change.

Thus, the example process of automated assessment scheduling architecture depicted in FIG. 3 illustrates that the automated assessment scheduling process of the present disclosure may simplify the management of complex assessment scheduling that includes multiple variables of consideration.

Figure 4:
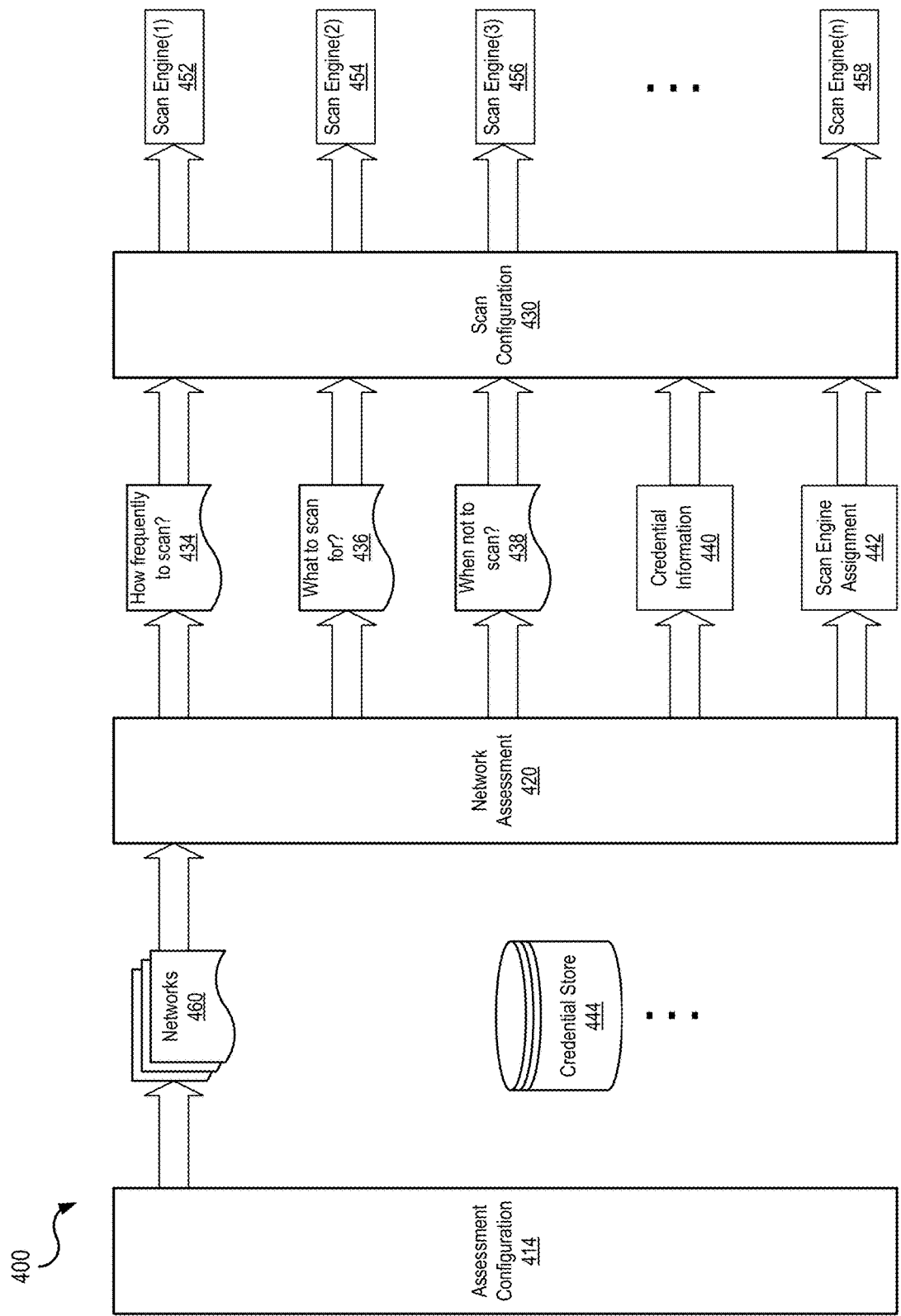
FIG. 4 is a block diagram illustrating an example automated assessment scheduling workflow, in accordance with some embodiments.

Referring to FIG. 4, a block diagram 400 illustrates an example automated assessment scheduling workflow, according to various embodiments. FIG. 4 illustrates that the automated assessment scheduling workflow may include an assessment configuration 414, a network assessment 420, and a scan configuration 430, according to some embodiments.

According to some embodiments, the assessment configuration 414 of FIG. 4 may correspond to the assessment configuration 114 of FIG. 1. FIG. 4 illustrates that the network assessment 420 may utilize information associated with one or more networks 460 from the assessment configuration 414. According to some embodiments, information associated with the one or more networks 460 of FIG. 4 may correspond to information associated with the one or more networks 160 of FIG. 1 (e.g., the first network 162, the second network 164, and the third network 166).

FIG. 4 illustrates that the network assessment 420 may provide various information to the scan configuration 430. FIG. 4 illustrates that, according to some embodiments, the information may include: information regarding how frequently to scan 434; information regarding what to scan for 436; information regarding when not to scan 438; credential information 440; and information regarding scan engine assignment 442.

According to some embodiments, the information regarding how frequently to scan 434 in the example depicted in FIG. 4 may correspond to the frequency 134 of the scheduling parameters 130 received as part of the user input 120, as depicted in FIG. 1. As previously described herein with respect to FIG. 1, the frequency 134 may be utilized to define the frequency attribute of the assessment configuration 114 (which may correspond to the assessment configuration 414 of FIG. 4), where the frequency attribute corresponds to how often assessments are to be completed (also referred to herein as "scan cadence"). According to various embodiments, the frequency attribute may correspond to one of a daily scan cadence, a weekly scan cadence, or a monthly scan cadence, among other alternatives.

According to some embodiments, the information regarding what to scan for 436 in the example depicted in FIG. 4 may correspond to the type 136 of the scheduling parameters 130 received as part of the user input 120, as depicted in FIG. 1. As previously described herein with respect to FIG. 1, the type 136 may be utilized to define a type attribute of the assessment configuration 114 (which may correspond to the assessment configuration 414 of FIG. 4), where the type attribute corresponds to a particular type of assessment to be completed (also referred to herein as a "scan type"). According to various embodiments, the type attribute may correspond to a vulnerability assessment, a policy assessment, or a discovery assessment, among other alternatives.

According to some embodiments, the information regarding when not to scan 438 in the example depicted in FIG. 4 may correspond to the exclusion window(s) 138 of the scheduling parameters 130 received as part of the user input 120, as depicted in FIG. 1. As previously described herein with respect to FIG. 1, the exclusion window(s) 138 may be utilized to define an exclusion window attribute of the assessment configuration 114 (which may correspond to the assessment configuration 414 of FIG. 4), where the exclusion window attribute corresponds to when assessments are not to be performed (also referred to herein as a "blackout window"). Examples of exclusion windows may include business hours, particular days of the week, or particular times of the year (e.g., two weeks before a corporation's end of quarter), among numerous other alternatives.

According to some embodiments, the credential information 440 may be obtained from at least one credential store 444 (e.g., one or more of a platform credential store, an on-premises credential store, and a third-party credential store). The at least one credential store 444 may contain information regarding various attributes associated with credentials. According to some embodiments, various attributes associated with a particular credential may include one or more of: a name attribute; a credential attribute; a network association attribute; a last used attribute; a successes attribute; a failures attribute; a successful network nodes attribute; a successful assets attribute; a failing network nodes attribute; and a failing assets attribute. The name attribute may correspond to a credential name. The credential attribute may correspond to a credential blob. The network association attribute may correspond to what networks the particular credential is associated with. The last used attribute may correspond to when the particular credential was last used. The successes attribute may correspond to how many times the particular credential has been successfully used. The failures attribute may correspond to how many times the particular credential has failed. The successful network nodes attribute may correspond to what network nodes have used the particular credential successfully. The successful assets attribute may correspond to what assets have used the particular credential successfully. The failing network nodes attribute may correspond to network nodes where the particular credential was not successful. The failing assets attribute may correspond to assets where the particular credential was not successful.

According to some embodiments, the scan engine assignment 442 may contain information regarding various attributes associated with a particular scan engine. According to some embodiments, various attributes associated with a particular scan engine may include one or more of: a name attribute; a cryptographic signature attribute; a state attribute; an active attribute; a last seen attribute; a product version attribute; a content version attribute; and a network associations attribute. The name attribute may correspond to a name of the particular scan engine. The cryptographic signature attribute may correspond to a public key signature of the particular scan engine for secure communications. The state attribute may correspond to whether or not the particular scan engine is online. The active attribute may correspond to whether or not the particular scan engine is running a scan. The last seen attribute may correspond to a time of a last communication with the particular scan engine. The product version attribute may correspond to a product version associated with the particular scan engine. The content version attribute may correspond to a content version associated with the particular scan engine. The network associations attribute may correspond to what networks the particular scan engine is permitted to scan, which may enable users to manage network reachability, to manage network load, and to create scan engine pools.

FIG. 4 illustrates that the scan configuration 430 may be communicated to one or more scan engines. In the example depicted in FIG. 4, multiple scan engines are illustrated, including at least a first scan engine 452, a second scan engine 454, and a third scan engine 456. According to some embodiments, the first scan engine 452 of FIG. 4 may correspond to the first scan engine 152 of the set of scan engines 150 depicted in FIG. 1. According to some embodiments, the second scan engine 454 of FIG. 4 may correspond to the second scan engine 154 of the set of scan engines 150 depicted in FIG. 1. According to some embodiments, the third scan engine 456 of FIG. 4 may correspond to the third scan engine 156 of the set of scan engines 150 depicted in FIG. 1. FIG. 4 further illustrates that, in some embodiments, the scan configuration 430 may be communicated to one or more additional scan engines, up to and including scan engine(n) 458.

Thus, the automated assessment scheduling workflow depicted in the example of FIG. 4 illustrates that automated assessment scheduling according to the present disclosure may simplify the management of complex assessment scheduling that includes multiple variables of consideration.

Figure 5:
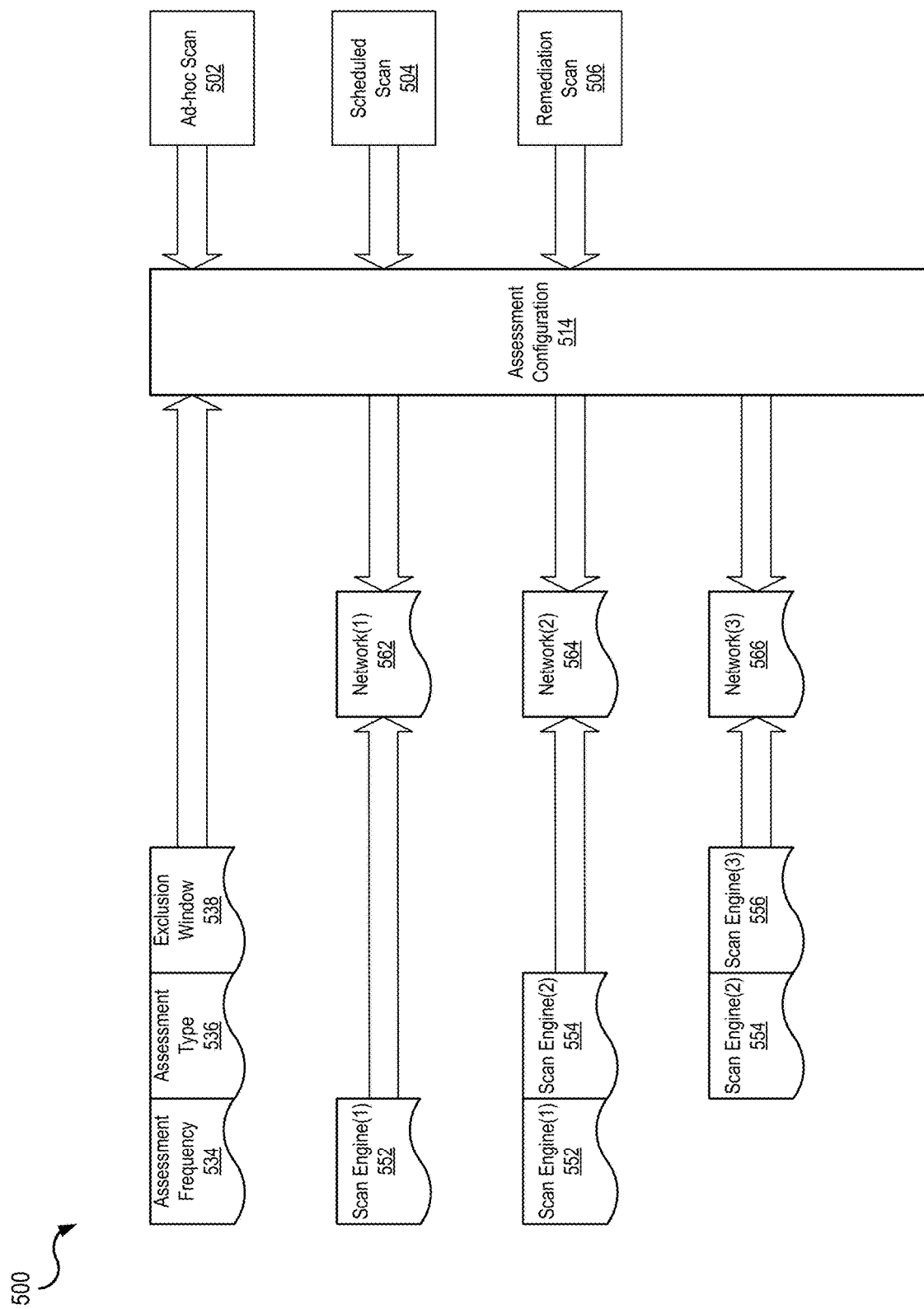
FIG. 5 is a block diagram illustrating an example automated assessment scheduling configuration workflow, in accordance with some embodiments.

Referring to FIG. 5, a block diagram 500 illustrates an example automated assessment scheduling configuration workflow, according to various embodiments.

FIG. 5 illustrates that an assessment configuration 514 according to the present disclosure may be utilized to perform an ad-hoc scan 502, a scheduled scan 504, or a remediation scan 506. According to some embodiments, the assessment configuration 514 of FIG. 5 may correspond to the assessment configuration 114 depicted in FIG. 1. FIG. 5 further illustrates that an assessment frequency 534, an assessment type 536, and an exclusion window 538 may represent inputs to the assessment configuration 514, according to various embodiments.

Figure 6:
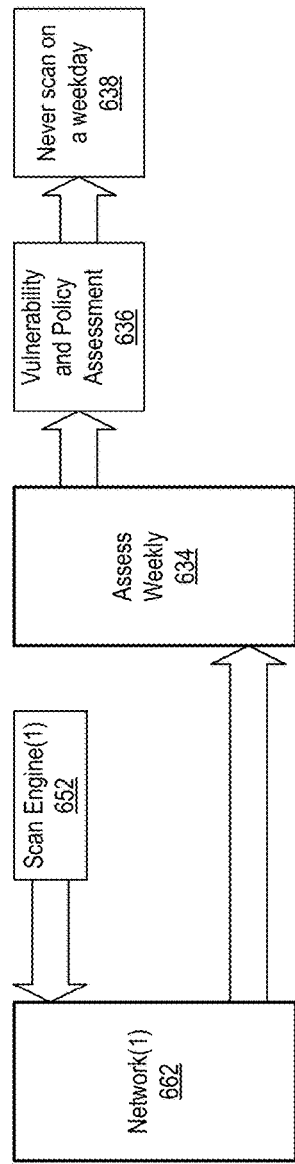
FIGS. 6 and 7 are block diagrams illustrating examples of automated assessment scheduling processes, in accordance with some embodiments.
Figure 7:
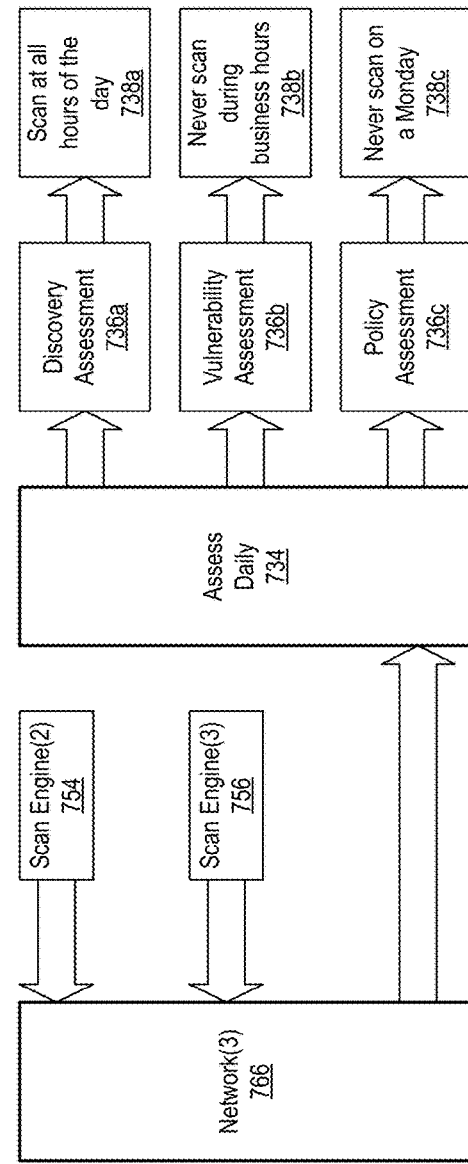

According to some embodiments, the assessment frequency 534 depicted in FIG. 5 may correspond to the frequency 134 of the scheduling parameters 130 received as part of the user input 120 of FIG. 1. The assessment frequency 534 of FIG. 5 may be utilized to define a frequency attribute of the assessment configuration 514, where the frequency attribute corresponds to how often assessments are to be completed (also referred to herein as "scan cadence"). According to various embodiments, the frequency attribute may correspond to one of a daily scan cadence, a weekly scan cadence, or a monthly scan cadence, among other alternatives. To illustrate, FIGS. 6 and 7 depict examples in which the scan cadences correspond to a weekly scan cadence and a daily scan cadence, respectively.

According to some embodiments, the assessment type 536 depicted in FIG. 5 may correspond to the type 136 of the scheduling parameters 130 received as part of the user input 120 of FIG. 1. The assessment type 536 of FIG. 5 may be utilized to define a type attribute of the assessment configuration 514, where the type attribute corresponds to a particular type of assessment to be completed (also referred to herein as a "scan type"). According to various embodiments, the type attribute may correspond to a vulnerability assessment, a policy assessment, or a discovery assessment, among other alternatives. To illustrate, FIGS. 6 and 7 depict examples in which the scan types correspond to a vulnerability assessment, a policy assessment, a discovery assessment, or a combination thereof.

According to some embodiments, the exclusion window 538 depicted in FIG. 5 may correspond to the exclusion window(s) 138 of the scheduling parameters 130 received as part of the user input 120 of FIG. 1. The exclusion window 538 of FIG. 5 may be utilized to define an exclusion window attribute of the assessment configuration 514, where the exclusion window attribute corresponds to when assessments are not to be performed (also referred to herein as a "blackout window"). Examples of exclusion windows may include business hours, particular days of the week, or particular times of the year (e.g., two weeks before a corporation's end of quarter), among numerous other alternatives. To illustrate, FIG. 6 depicts an example in which an exclusion window corresponds to particular days of the week (e.g., weekdays), and FIG. 7 depicts examples in which there is no exclusion window (e.g., scan at all hours of the day) and exclusion windows corresponding to particular hours of the day (e.g., business hours) or a particular day (e.g., Monday).

FIG. 5 illustrates that the assessment configuration 514 may identify a single scan engine or multiple scan engines to utilized to perform assessments/scans of particular networks, according to some embodiments. As an example, FIG. 5 illustrates that the assessment configuration 514 may identify a first scan engine 552 as a single scan engine to be utilized to perform assessments/scans of a first network 562. According to some embodiments, the first scan engine 552 of FIG. 5 may correspond to the first scan engine 152 of FIG. 1, and the first network 562 of FIG. 5 may correspond to the first network 162 of FIG. 1. As another example, FIG. 5 illustrates that the assessment configuration 514 may identify the first scan engine 552 and a second scan engine 554 as multiple scan engines to be utilized to perform assessments/scans of a second network 564. According to some embodiments, the second scan engine 554 of FIG. 5 may correspond to the second scan engine 154 of FIG. 1, and the second network 564 of FIG. 5 may correspond to the second network 164 of FIG. 1. As yet another example, FIG. 5 illustrates that the assessment configuration 514 may identify the second scan engine 554 and a third scan engine 556 as multiple scan engines to be utilized to perform assessments/scans of a third network 566. According to some embodiments, the third scan engine 556 of FIG. 5 may correspond to the third scan engine 156 of FIG. 1, and the third network 566 of FIG. 5 may correspond to the third network 166 of FIG. 1.

Thus, the automated assessment scheduling configuration workflow depicted in the example of FIG. 5 illustrates that automated assessment scheduling according to the present disclosure may simplify the management of complex assessment scheduling that includes multiple variables of consideration.

FIGS. 6 and 7 are block diagrams 600, 700 illustrating examples of automated assessment scheduling processes, in accordance with some embodiments.

Referring to FIG. 6, a block diagram 600 depicts a first example of an automated assessment scheduling process, in accordance with some embodiments.

FIG. 6 illustrates an example in which an assessment frequency 634 corresponds to a weekly scan cadence (depicted as "Assess Weekly" in FIG. 6). According to some embodiments, the assessment frequency 634 depicted in FIG. 6 may correspond to the frequency 134 of the scheduling parameters 130 received as part of the user input 120 of FIG. 1. The assessment frequency 634 of FIG. 6 may be utilized to define a frequency attribute of an assessment configuration, such as the assessment configuration 114 depicted in FIG. 1 or the assessment configuration 514 depicted in FIG. 5.

FIG. 6 further illustrates an example in which multiple scan types are both associated with the same exclusion window. To illustrate, multiple scan types 636 correspond to a vulnerability assessment and a policy assessment (depicted as "Vulnerability and Policy Assessment" in FIG. 6), with each associated with a single exclusion window 638 corresponding to particular days (depicted as "Never scan on a weekday" in FIG. 6). According to some embodiments, each of the scan types 636 depicted in FIG. 6 may correspond to the type 136 of the scheduling parameters 130 received as part of the user input 120 of FIG. 1 (where each of the different scan types may be received as separate user inputs, in some cases). Each of the scan types 636 of FIG. 6 may be utilized to define individual type attributes of an assessment configuration, such as the assessment configuration 114 depicted in FIG. 1 or the assessment configuration 514 depicted in FIG. 5. According to some embodiments, the exclusion window 638 depicted in FIG. 6 may correspond to the exclusion window(s) 138 of the scheduling parameters 130 received as part of the user input 120 of FIG. 1. The exclusion window 638 of FIG. 6 may be utilized to define an exclusion window attribute of an assessment configuration, such as the assessment configuration 114 depicted in FIG. 1 or the assessment configuration 514 depicted in FIG. 5.

FIG. 6 further illustrates an example in which a single scan engine is utilized to perform assessments/scans of a particular network. According to some embodiments, the assessment scheduler 116 of FIG. 1 may be utilized in combination with the scan manager 118 of FIG. 1 to automatically identify the single scan engine and to automatically schedule assessments/scans of the particular network. To illustrate, in FIG. 6, a first scan engine 652 is utilized to perform assessments/scans of a first network 662. According to some embodiments, the first scan engine 652 of FIG. 6 may correspond to the first scan engine 152 of FIG. 1 or the first scan engine 552 of FIG. 5, and the first network 662 of FIG. 6 may correspond to the first network 162 of FIG. 1 or the first network 562 of FIG. 5.

Referring to FIG. 7, a block diagram 700 depicts a second example of an automated assessment scheduling process, in accordance with some embodiments.

FIG. 7 illustrates an example in which an assessment frequency 734 corresponds to a daily scan cadence (depicted as "Assess Daily" in FIG. 7). According to some embodiments, the assessment frequency 734 depicted in FIG. 7 may correspond to the frequency 134 of the scheduling parameters 130 received as part of the user input 120 of FIG. 1. The assessment frequency 734 of FIG. 7 may be utilized to define a frequency attribute of an assessment configuration, such as the assessment configuration 114 depicted in FIG. 1 or the assessment configuration 514 depicted in FIG. 5.

FIG. 7 further illustrates an example in which different scan types are associated with different exclusion windows. To illustrate, a first scan type 736a corresponds to a discovery assessment, which is associated with a first exclusion window 738a that is undefined (depicted as "Scan at all hours of the day" in FIG. 7). A second scan type 736b corresponds to a vulnerability assessment, which is associated with a second exclusion window 738b corresponding to particular times (depicted as "Never scan during business hours" in FIG. 7). A third scan type 736c corresponds to a policy assessment, which is associated with a third exclusion window 738c corresponding to a particular day (depicted as "Never scan on a Monday" in FIG. 7). According to some embodiments, each of the scan types 736a, 736b, and 736c depicted in FIG. 7 may correspond to the type 136 of the scheduling parameters 130 received as part of the user input 120 of FIG. 1 (where each of the different scan types may be received as separate user inputs, in some cases). Each of the scan types 736a, 736b, and 736c of FIG. 7 may be utilized to define individual type attributes of an assessment configuration, such as the assessment configuration 114 depicted in FIG. 1 or the assessment configuration 514 depicted in FIG. 5. According to some embodiments, each of the exclusion windows 738a, 738b, and 738c depicted in FIG. 7 may correspond to the exclusion window(s) 138 of the scheduling parameters 130 received as part of the user input 120 of FIG. 1 (where each of the different exclusion windows may be received as separate user inputs, in some cases). Each of the exclusion windows 738a, 738b, and 738c of FIG. 7 may be utilized to define individual exclusion window attributes of an assessment configuration, such as the assessment configuration 114 depicted in FIG. 1 or the assessment configuration 514 depicted in FIG. 5.

FIG. 7 further illustrates an example in which multiple scan engines are utilized to perform assessments/scans of a particular network (see e.g., the scan engine assignment 442 as illustrated and described herein with respect to FIG. 4). According to some embodiments, the assessment scheduler 116 of FIG. 1 may be utilized in combination with the scan manager 118 of FIG. 1 to automatically identify the multiple scan engines and to automatically schedule assessments/scans of the particular network. To illustrate, in FIG. 7, a second scan engine 754 and a third scan engine 756 are utilized to perform assessments/scans of a third network 766. According to some embodiments, the second and third scan engines 754, 756 of FIG. 7 may correspond to the second and third scan engines 154, 156 of FIG. 1 or the second and third scan engines 554, 556 of FIG. 5, and the third network 766 of FIG. 7 may correspond to the third network 166 of FIG. 1 or the third network 566 of FIG. 5.

Thus, FIGS. 6 and 7 illustrate examples of automated assessment scheduling processes. FIGS. 6 and 7 illustrate that automated assessment scheduling processes according to the present disclosure may simplify the management of complex assessment scheduling that includes multiple variables of consideration.

FIG. 8 is a flowchart 800 that illustrates an example of an automated assessment scheduling process, according to some embodiments. According to various embodiments, one or more hardware processors (with associated memory) may be used to implement the automated assessment scheduling process depicted in the example of FIG. 8.

At operation 810, the process includes receiving a set of scheduling parameters. The set of scheduling parameters include at least: a frequency corresponding to how often assessments are to be completed via a particular automated assessment; and a type of assessment to perform in the particular automated assessment. For example, referring to FIG. 1, the assessment configuration interface 112 may receive the user input 120 that includes the scheduling parameters 130. FIG. 1 illustrates that the scheduling parameters 130 received as part of the user input 120 include at least the frequency 134 and the type 136. As described herein, for a particular assessment, the frequency 134 may correspond to how often assessments are to be completed, and the type 136 may correspond to a particular type of assessment to be completed (e.g., vulnerability, policy, discovery, etc.).

At operation 820, the process includes generating, based at least in part on the set of scheduling parameters, an assessment configuration comprising a set of attributes defining how the particular automated assessment is to be performed. For example, referring to FIG. 1, the assessment configuration 114 may be generated based at least in part on the scheduling parameters 130. As described herein, the assessment configuration 114 includes a set of attributes defining how a particular assessment is to be performed. For example, the frequency 134 may be utilized to define a frequency attribute of the assessment configuration 114, where the frequency attribute corresponds to how often assessments are to be completed (also referred to herein as "scan cadence") for a particular assessment. According to various embodiments, the frequency attribute may correspond to one of a daily scan cadence, a weekly scan cadence, or a monthly scan cadence, among other alternatives. As another example, the type 136 may be utilized to define a type attribute of the assessment configuration 114, where the type attribute corresponds to a particular type of assessment to be completed (also referred to herein as a "scan type"). According to various embodiments, the type attribute may correspond to a vulnerability assessment, a policy assessment, or a discovery assessment, among other alternatives.

At operation 830, the process includes identifying at least one scan engine resource of a set of scan engine resources for utilization in the particular automated assessment. For example, referring to FIG. 1, the assessment scheduler 116 in combination with the scan manager 118 may identify at least one scan engine of the set of scan engines 150 for utilization in the particular automated assessment. In the particular embodiment depicted in FIG. 1, the set of scan engines 150 includes at least the first scan engine 152, the second scan engine 154, and the third scan engine 156. In some cases, a single scan engine may be identified for utilization in the particular automated assessment (see e.g., FIG. 6). In other cases, multiple scan engines may be identified for utilization in the particular automated assessment (see e.g., FIG. 7).

At operation 840, the process includes automatically initiating, based at least in part on the assessment configuration and using the at least one scan engine resource, the particular automated assessment. For example, referring to FIG. 1, the particular automated assessment may be automatically initiated based at least in part on the assessment configuration 114 and using at least one scan engine of the set of scan engines 150.

Thus, FIG. 8 illustrates an example of a process of implementing automated assessment scheduling. The example process depicted in FIG. 8 may simplify the management of complex assessment scheduling that includes multiple variables of consideration.

Figure 9:
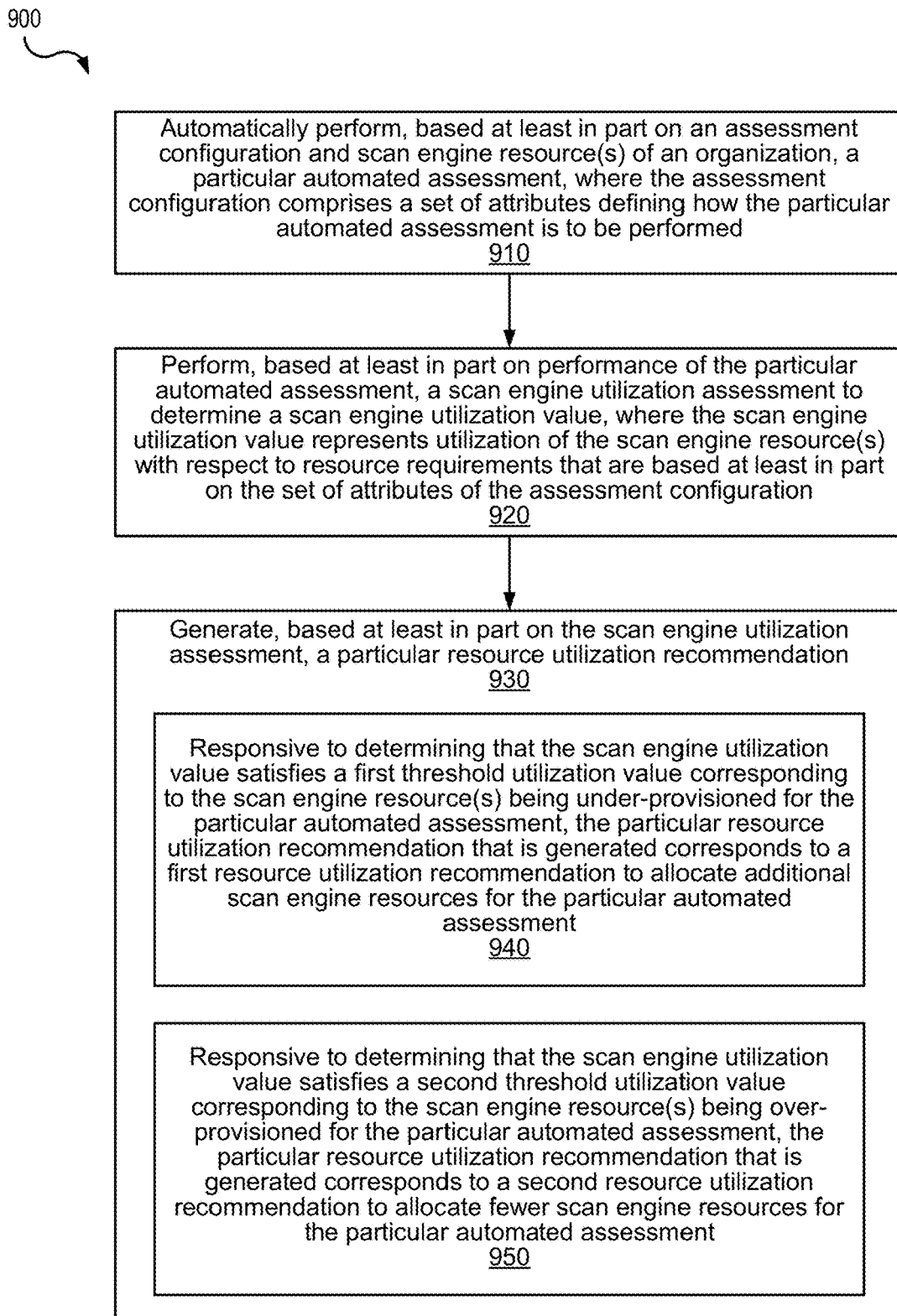
FIG. 9 is a flowchart that illustrates an example of an automated assessment scheduling process that includes generating a resource utilization recommendation, according to some embodiments.

FIG. 9 is a flowchart 900 that illustrates an example of an automated assessment scheduling process that includes generating a resource utilization recommendation, according to some embodiments. According to various embodiments, one or more hardware processors (with associated memory) may be used to implement the automated assessment scheduling process depicted in the example of FIG. 9.

At operation 910, the process includes automatically performing, based at least in part on an assessment configuration and one or more scan engine resources of an organization, a particular automated assessment. The assessment configuration comprises a set of attributes defining how the particular automated assessment is to be performed. For example, referring to FIG. 1, a particular automated assessment may be automatically performed based at least in part on the assessment configuration 114 and one or more scan engines of the set of scan engines 150.

At operation 920, the process includes performing, based at least in part on performance of the particular automated assessment, a scan engine utilization assessment to determine a scan engine utilization value. The scan engine utilization value represents utilization of the one or more scan engine resources with respect to resource requirements that are based at least in part on the set of attributes of the assessment configuration. For example, referring to FIG. 1, the scan manager 118 may perform a scan engine utilization assessment to determine a scan engine utilization value based at least in part on the performance of the particular automated assessment.

At operation 930, the process includes generating a particular resource utilization recommendation based at least in part on the scan engine utilization assessment. FIG. 9 illustrates that the particular resource utilization recommendation may correspond to one of a first resource utilization recommendation or a second resource utilization recommendation. For example, while not shown in FIG. 1, the assessment configuration interface 112 may be configured to generate the particular resource utilization recommendation (e.g., for presentation to the user 122) based at least in part on the scan engine utilization assessment performed by the scan manager 118. According to some embodiments, the first resource utilization recommendation may include an estimate of an additional number of scan engine resources to satisfy the resource requirements.

FIG. 9 illustrates, at operation 940, that the particular resource utilization recommendation that is generated may correspond to a first resource utilization recommendation to allocate additional scan engine resources for the particular automated assessment. The first resource utilization recommendation may be generated responsive to determining that the scan engine utilization value satisfies a first threshold utilization value corresponding to the one or more scan engines being under-provisioned for the particular automated assessment. According to some embodiments, the second resource utilization recommendation may include an estimate of a reduced number of scan engine resources to satisfy the resource requirements.

FIG. 9 illustrates, at operation 950, that the particular resource utilization recommendation that is generated may correspond to a second resource utilization recommendation to allocate fewer scan engine resources for the particular automated assessment. The second resource utilization recommendation may be generated responsive to determining that the scan engine utilization value satisfies a second threshold utilization value corresponding to the one or more scan engines being over-provisioned for the particular automated assessment.

Thus, FIG. 9 illustrates an example of a process of an automated assessment scheduling process that includes generating a resource utilization recommendation. FIG. 9 illustrates that the systems and methods of the present disclosure may provide the ability to identify when there are insufficient scan engine resources to accomplish desired scan scheduling preferences. In such cases, the user may be provided with feedback on whether or not additional resources are recommended as well as estimates on those additional resource recommendations. FIG. 9 further illustrates that the systems and methods of the present disclosure may provide the ability to identify over-provisioning of resources (that is, an excess number of scan engines). In such cases, the user may be provided with feedback to reduce the provisioned scan engine resources.

FIG. 10 is a block diagram illustrating an example computer system 1000 that is used to implement one or more portions of a system that implements automated assessment scheduling, according to some embodiments. For example, in some cases, the computer system 1000 may be a server that implements one or more components of the computing resource(s) 110 depicted in FIG. 1.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device.

The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, in some cases, the executable instructions may include instructions to implement the assessment configuration interface 112, the assessment scheduler 116, and the scan manager 118, as discussed.

The system memory 1020 may also be used to store data 1026 needed or produced by the executable instructions. For example, the in-memory data 1026 may include portions of the assessment configuration 114, the inflight assessments 222, and the pending assessments 224, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems.

Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

As described herein, in order to perform a network scan with remote, distributed scan engines, a user may explicitly specify the specific scan engine (or engines). With large, complex networks, determining which scan engines are capable of scanning targets (also referred to herein as "assets" or "target assets") can be challenging. This is due to the fact that prior knowledge about the networks and subnets that a scan engine is capable of connecting to must be known. Furthermore, the knowledge about which networks and subnets that a scan engine is capable of connecting to may not be readily available to the scan engine. Instead, this information may be collected through tooling (either passively or actively), or the information may be "boot-strapped" through manual intervention.

The present disclosure describes a set of strategies and a process through which the networks and subnets that a scan engine is capable of connecting to can be stored and used to intelligently and automatically assign scan engines to targets for a given scan.

The systems and methods of the present disclosure may be advantageous by removing the requirement for users to manually specify which scan engine or scan engines to use when starting a network scan. The present disclosure outlines a set of strategies and a process for determining whether a scan engine should be used as part of a network scan. The present disclosure describes various possible strategies for determining whether the scan engine is capable of scanning any of the targets configured for a network scan. The present disclosure also describes a process that ranks the various strategies used to collect the data about engine connectivity to ensure that the most satisfactory strategy is used when assigning targets to a scan engine. Further, the present disclosure provides a set of possible tie-breaker strategies for cases in which multiple scan engines are capable of scanning a target. In such cases, the tie-breaker strategy can be implied to allow the most satisfactory (as defined by the given strategy) scan engine to be used.

Thus, the present disclosure may remove a long-standing requirement that users understand or self-manage the mapping of accessible networks to scan engines. Generally, users must have enough organizational knowledge to know whether a particular scan engine is capable of scanning a given set of targets. The systems and methods of the present disclosure seek to automate that work and to eliminate or reduce user intervention as much as possible.

As described herein, one goal of the present disclosure is to remove the need for users to specify which scan engine to use when starting a scan. Instead, scan engine assignment may be done automatically when a scan is started (e.g., via a platform scanning API). This may greatly reduce the burden on users to constantly determine which scan engine is the most appropriate when scanning a given target. Additionally, as described herein, another goal that may be achieved through this capability is platform scan engine pooling. When starting a scan against multiple targets, it may be possible that more than one scan engine may be assigned to the scan.

As used herein, the terms "target" or "target asset" (or "targets" or "target assets") specifies one or more assets that are targeted for a scan. A target (or targets) may be any of the following types: a single IP address; a range of IP addresses; a CIDR value; or a domain name. As used herein, the term "target binding" (or "source" binding) is used to refer to an association of a target to a specific scan engine. Users may bind a target to a scan engine to indicate that a particular scan engine is a preferred scan engine to be utilized when scanning the target.

As used herein, the term "network interface data" refers to the fact that each host that a scan engine runs on contains one or more network interfaces. When the scan engine sends metrics to the platform, the scan engine submits a list of the network interfaces available on the system, as well as the subnets for those interfaces. As used herein, the terms "scan configuration" or "scan configuration service" refer to an internal service responsible for handling and submitting scan commands (e.g., a start scan command, a stop scan command, a scan status command, etc.). As used herein, the terms "engine assignment strategy" or "scan engine assignment strategy" refer to the strategy that the platform determines is the most satisfactory when assigning a scan engine for a given target.

There are multiple approaches that may be utilized when determining which scan engine to use when scanning a given target. Each approach depends on what data is available as well as different guarantees that the approach will actually select the "best" or "most satisfactory" scan engine for a given asset. To account for these different approaches, as well as to make the system capable of handling novel approaches in the future, the present disclosure contemplates the utilization of a strategy pattern architecture. This may effectively allow the platform scanning API to determine which is the most satisfactory strategy to use at the time that a given scan is started. The platform scanning API, when it receives a start scan command, may cycle through an ordered list of strategies to determine which one should be used to assign scan engines to the scan. This approach of the present disclosure may allow for iteration and improvement on this capability.

The following description relates to various engine assignment strategies which may be included as part of scan engine assignment, according to some embodiments. One of ordinary skill in the art will appreciate that the example engine assignment strategies represent illustrative, non-limiting examples and that additional and/or alternative approaches to scan engine assignment may be utilized.

One scan engine assignment strategy is referred to herein as a "passive discovery strategy" or a "network sensing strategy." With this strategy, a passive network sensing device may be deployed alongside each scan engine. This network sensing device may capture packets and record the IP address and/or networks that those packets arrived from. Using this information, a database of reachable targets can be constructed over time and used to inform as to which targets a particular scan engine is capable of reaching. One advantage associated with such a passive discovery strategy is that it does not rely on a user-initiated operation to begin collecting information. Rather, packets are continuously collected and stored. One disadvantage associated with such a passive discovery strategy is that it does not guarantee that all possible targets are available in the database. Rather, the database is constructed based on those targets or networks that are broadcast packets (or non-broadcast packets in the case of packet capture in promiscuous mode).

One scan engine assignment strategy is referred to herein as an "active discovery strategy" or an "Nmap output strategy." With this strategy, the platform maintains a data store containing nmap output received from each of the scan engines. This nmap output may include information, such as: which hosts a scan engine is capable of reaching; what the latency is between the engine and hosts; and what ports are available to the engine, among other possibilities. Using this information, the platform may be able to determine not only which scan engines are capable of scanning a given target but also which scan engine is most satisfactorily equipped to scan that target. For example, there may be two scan engines that are both capable of reaching a particular target. However, one of those scan engines is within the target's local subnet, and one of those scan engines is not within the target's local subnet. As a result, the latency between the scan engine that is within the target's local subnet may be lower and the scan engine may be capable of scanning more ports. One disadvantage associated with the active discovery strategy is that it will not find non-responsive assets, such as a hardened computer or various IoT devices.

The active discovery strategy relies on data uploaded to the platform from previously executed nmap discovery scans from each of the scan engines. One advantage associated with such an active discovery strategy is that it provides the highest guarantee of all strategies that the most satisfactorily equipped engine is selected to scan a particular target. Another advantage associated with such an active discovery strategy is that it is capable of going beyond simple "reachability" when deciding which scan engine to utilize. That is, such an active discovery strategy can also take into account port data. One disadvantage associated with such an active discovery strategy is that it relies on information from nmap discovery scans previously performed by the scan engines.

One scan engine assignment strategy is referred to herein as a "target binding strategy." With this strategy, a user may be able to explicitly specify the target asset(s) that a given scan engine is capable of scanning. The user may be provided with a management API that may provide the user with the capability of assigning/binding target(s) to a given scan engine. When a scan is initiated via the platform, the scan configuration service may refer to the target bindings for all engines to determine whether any of the engines match the target(s) specified in a start scan command. One or more scan engines that match the specified target(s) may be assigned to scan the given target(s). One advantage associated with such a target binding strategy is that it provides customers with a tool to manage the mapping between scan engines and targets that a given engine is capable of scanning. Another advantage associated with such a strategy is that it capable of supporting IP addresses, IP ranges, CIDRs, and hostnames. One disadvantage associated with such a target binding strategy is that it still requires manual intervention on the part of the user. That is, a user is required to know beforehand which targets that a given scan engine is capable of scanning (i.e., prior network knowledge is required of the user).

With the target binding strategy, a target binding API may provide support for target binding for a variety of targets. For example, for an IP address target type, the target binding strategy may map a specific IP address to a given scan engine. As another example, for an IP range target type, the target binding strategy may map a range of IP addresses to a given scan engine. As yet another example, for a CIDR target type, the target binding strategy may map a CIDR to a given scan engine. As a further example, for a domain name target type, the target binding strategy may map a domain name to a given scan engine, and any targets contained within the domain are scanned by the given scan engine.

One scan engine assignment strategy is referred to herein as an "engine subnet strategy" or a "scan engine subnet strategy." With this strategy, the scan configuration service refers to the subnets that one or more scan engines are directly connected to in order to determine whether any of the scan engines are capable of scanning the given targets. The platform may store data related to all of the network interfaces that are available on a given host machine where a given scan engine is installed. This data may include the subnets that a given scan engine is associated with. If a target falls within the range of a subnet that a particular scan engine is part of, then that particular scan engine may be assigned to scan the target. One advantage associated with such an engine subnet strategy is that it does not require any manual intervention on the part of the user. One disadvantage associated with this strategy is that using the subnet data may not guarantee that the engine is capable of actually scanning a particular target. Another disadvantage associated with this strategy is resolving domain names, as the subnet data may only provide insights into IP-based targets (e.g., one or more IP addresses, ranges, CIDRs, etc.). That is, there may be no DNS-related data available as part of the subnet data.

One scan engine assignment strategy is referred to herein as an "explicit assignment strategy." With this strategy, a user may explicitly specify which scan engine to utilize as part of a scan. This may correspond to a conventional strategy. Although this strategy is not an automated approach, the strategy is identified in the present disclosure to emphasize the fact that users are still provided the ability to override any automated scan engine selection. One advantage associated with such an explicit assignment strategy is that it provides a user with the ability to disable the automated scan engine assignment by allowing the user to explicitly specify which engines to utilize as part of a scan. One disadvantage associated with such a strategy is that it does not provide automated scan engine assignment.

Figure 12:
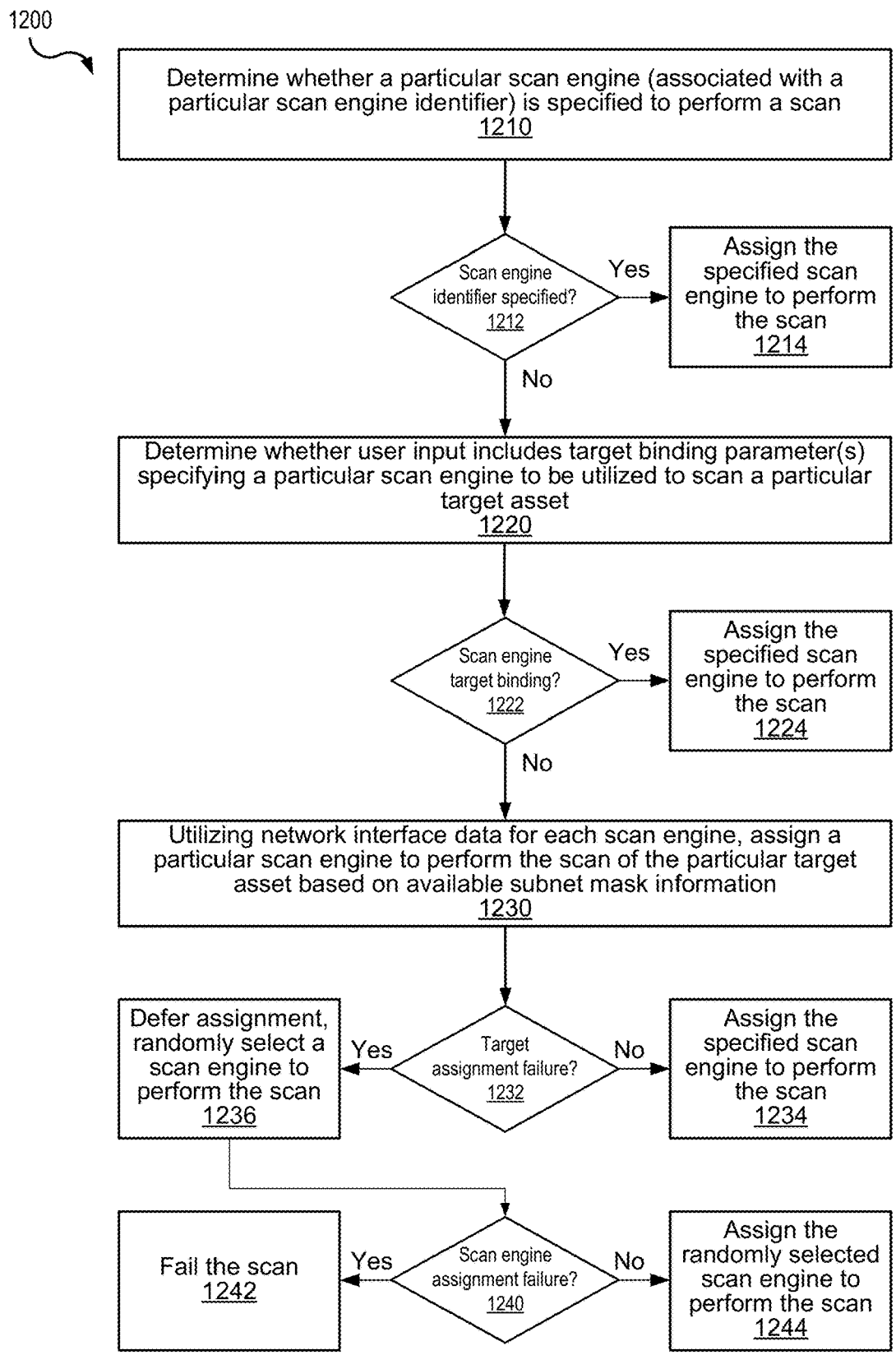
FIG. 12 is a flowchart that illustrates an example process of automated scan engine assignment, according to some embodiments.

As illustrated and described further herein with respect to FIG. 12, the present disclosure contemplates engine assignment strategy precedence, in which a particular order may be followed when assigning targets to a given scan engine. According to some embodiments, the following order may be followed: (i) explicit assignment strategy; (ii) target binding strategy; and (iii) scan engine subnet strategy. To illustrate, if a start scan command specifies a scan engine identifier (i.e., explicit assignment), then all targets may be assigned to that scan engine. It should be noted that the specification of more than one scan engine may not be supported using this strategy. Proceeding to the target binding strategy, the system of the present disclosure may evaluate each target against all target bindings for all engines. If the user specifies that a particular scan engine is to be utilized to scan a particular target asset, such a user preference is to be followed. Proceeding to the scan engine subnet strategy, using the network interface data for each engine, the system of the present disclosure may determine an appropriate engine to utilize based on the subnet masks available. As illustrated and described further herein with respect to FIG. 12, if a target fails to be assigned using the previously described strategies, the system of the present disclosure may employ a strategy of deferred assignment of a target and random selection of a scan engine, according to some embodiments. To illustrate, the assignment of a target may be deferred until after all other targets have been assigned. Once all other targets have been assigned to engines, the system of the present disclosure may randomly select an engine from the list of assigned engines and assign that engine to the deferred target (assuming at least one other target was assigned to that engine). If none of the above-described options allow for the assignment of a target to an engine, the automated assignment system of the present disclosure may fail the scan, according to some embodiments.

Figure 13:
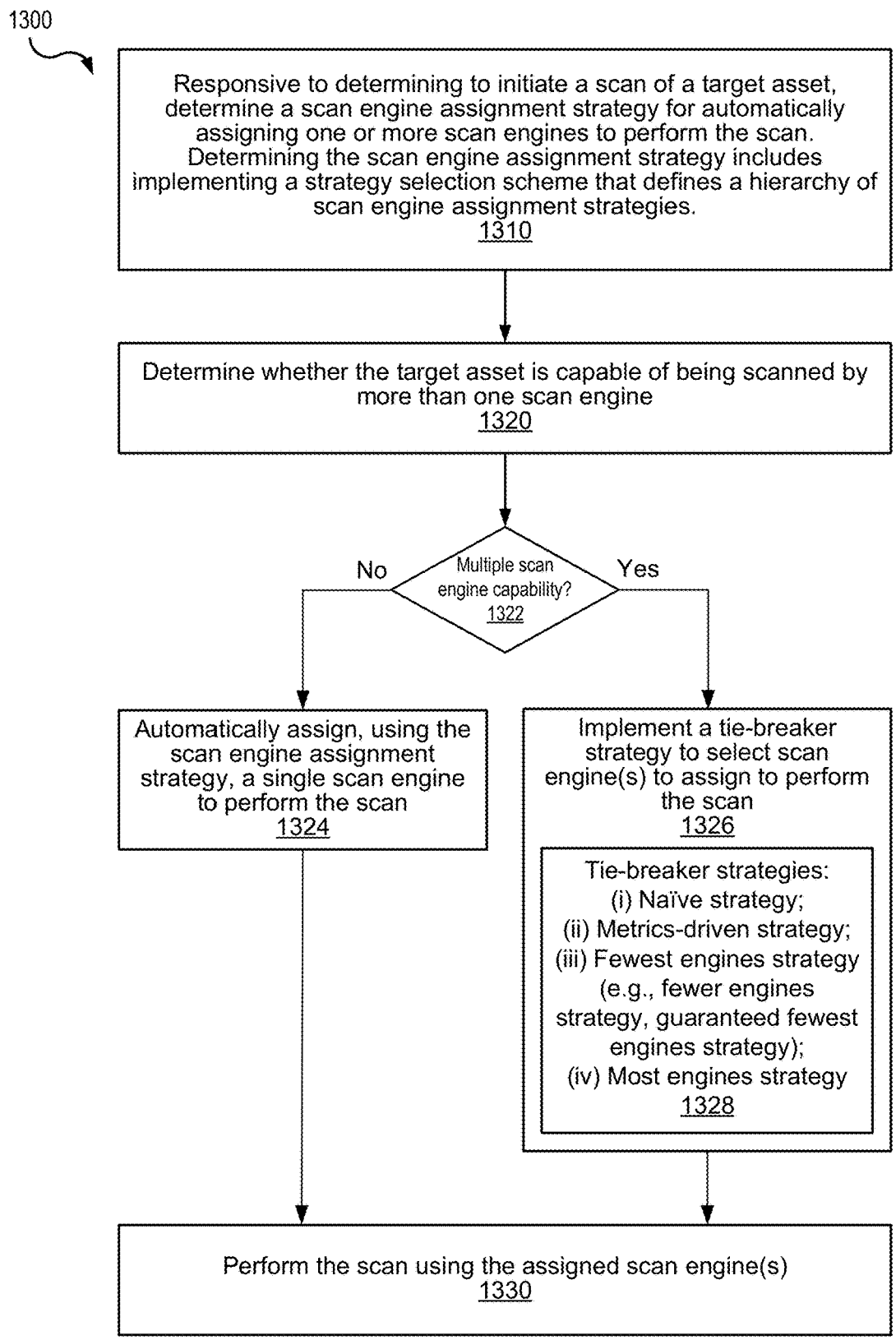
FIG. 13 is a flowchart that illustrates an example process of automated scan engine assignment, according to some embodiments.

As illustrated and described further herein with respect to FIG. 13, there may be cases where a target is capable of being scanned by more than one scan engine. In such cases, various tie-breaker strategies may be employed in order to determine which scan engine is to be assigned to scan a given target, according to some embodiments. As described herein, the various tie-breaker strategies may include: (i) a naïve strategy; (ii) a metrics-driven strategy; (iii) a fewest engines strategy; and (iv) a most engines strategy.

With regard to the "naïve" tie-breaker strategy, such a strategy may iterate a list of platform-enabled scan engines and select the first engine that is capable of scanning the target. It should be noted that, with this approach, there is the potential for a scan to be distributed across more scan engines than required to complete the scan.

With regard to the "metrics-driven" tie-breaker strategy, in cases where multiple engines are capable of scanning a given target, metrics data related to the scan engine can be used to determine which scan engine to utilize. There may be various metrics that may be utilized to influence which engine is used to scan a given target, according to some embodiments. To illustrate, non-limiting examples of such metrics may include: (i) latency between engine and target; (ii) average latency between engine and network; (iii) current engine resource utilization; and (iv) estimated engine resource utilization.

Regarding the metric of latency between engine and target, the system of the present disclosure may be configured to evaluate the network latency (i.e., round-trip-time or "RTT") between the scan engine and the target. Whether this metric may be utilized depends on the availability of historical latency data between the engine and the target. Regarding the metric of average latency between engine and network, the system of the present disclosure may be configured to examine the average latency (RTT) between the scan engine and the targets on the network. Whether this metric may be utilized depends on the availability of historical average latency data between the scan engine and the rest of the network. Regarding the metric of current engine resource utilization, the system of the present disclosure may be configured to examine current (real-time) resource utilization of a given engine. By comparing resource utilization between scan engines, targets may be assigned to those engines with enough available resources. Regarding the metric of estimated engine resource utilization (related to the "current" engine resource utilization), the system of the present disclosure may be configured to estimate resource utilization of a given scan engine based on the number of targets that have been assigned to the engine for a given scan but that have not yet been submitted to the engine for scanning.

With regard to the "fewest engines" tie-breaker strategy, such a strategy may be useful in cases where it is advantageous to reduce the number of scan engines to be utilized as part of a scan (e.g., to a "minimum" number of scan engines). This strategy may iterate over all targets and identify the "minimum" set of engines that are capable of scanning the entire set of targets. According to some embodiments, the "fewest engines" strategy may include either a "fewer" engines strategy or a "guaranteed fewest engines" strategy.

With respect to the "fewer engines" strategy, the system of the present disclosure may be configured to determine whether an engine has already been identified as being capable of scanning a given target. In such cases, this approach may determine whether that engine is capable of scanning any of the other targets before iterating over the complete list of scan engines. This approach may be advantageous compared to the naïve strategy in terms of the number of engines to be utilized as part of the scan. However, this approach may not guarantee that the fewest number of engines is utilized as part of the scan. For example, there may be a scenario where the goal is to scan five targets and there are three platform-enabled engines (referred to as ENGINE_A, ENGINE_B, and ENGINE_C for this scenario). The system may determine that ENGINE_A is capable of scanning the first four targets but is not capable of scanning the fifth target. According to some embodiments, this approach may then involve iterating the list of engines to determine that ENGINE_B is capable of scanning the fifth target. In this example, the scan would utilize ENGINE_A (i.e., to scan the first four targets) as well as ENGINE_B (i.e., to scan the fifth target). However, ENGINE_C may have been capable of scanning all five targets, thereby reducing the number of scan engines involved in scanning the five targets to a single engine.

With respect to the "guaranteed fewest engines" strategy, the system of the present disclosure may be configured to identify a list of all engines that are capable of scanning a given target. The result may be a map of engines [target]. The system may then evaluate the list of engines and determine which engine is capable of scanning the largest number of targets. The system may then remove those targets from the map and re-evaluate the map to identify the particular engine that is capable of scanning the largest number of remaining targets. This process may be repeated until all targets have been assigned to a scan engine. One disadvantage associated with this approach is that, in the case of a large number of targets or a large number of engines, assignment may potentially be CPU-intensive and/or time-consuming.

With respect to the "most engines" strategy, such a strategy may be useful in cases where it is advantageous to maximize the number of engines to be utilized as part of the scan. For this strategy, the algorithm may iterate over all targets to ensure a balanced distribution of targets across all engines. Any engines without targets associated with them may be assumed to be incapable of scanning any of the targets.

With the systems and methods of the present disclosure, there may be other scenarios that may affect automated engine assignment. For example, one such scenario involves the handling of partial ranges of IP addresses. To illustrate, a scan engine may be capable of scanning only a portion of a target. As an illustrative example, a scan engine may have a target binding such that it is capable of scanning IP addresses within a particular IP address range (e.g., from an IP address of 10.0.0.10 to an IP address of 10.0.0.20). In this example, a scan may be initiated that contains a target IP range of 10.0.0.5 to 10.0.0.15. In this case, the engine is only bound to the last five IP addresses in the target IP range (i.e., from an IP address of 10.0.0.10 to an IP address of 10.0.0.15). For this scenario, there may be various options for selecting a scan engine, including a "naïve approach" to engine selection and a "weighted approach" to engine selection.

With respect to the "naïve approach" to engine selection, there is a requirement that target bindings match exactly; otherwise, the engine is not selected due to binding matching (although the engine may still be selected as part of the fallback to using the engine's network interface data). With this approach, since the engine cannot fully satisfy scanning the entire target IP range, it is not assigned to a given target based on the binding criteria. Additionally, all other engines paired to the platform may be evaluated to determine whether they have a target binding that satisfies the target IP range. If none of the other engines contain a target binding, then the approach may fallback to using the engine's network interface data. With respect to the "weighted approach" to engine selection, the target ranges may be decomposed into the smallest units possible (i.e., individual IP addresses). These individual IP addresses are then compared against the bindings for each engine and a score is generated that is indicative of which engine contains bindings that scan the greatest number of IP addresses. One disadvantage is that this represents a relatively complicated approach.

Figure 11:
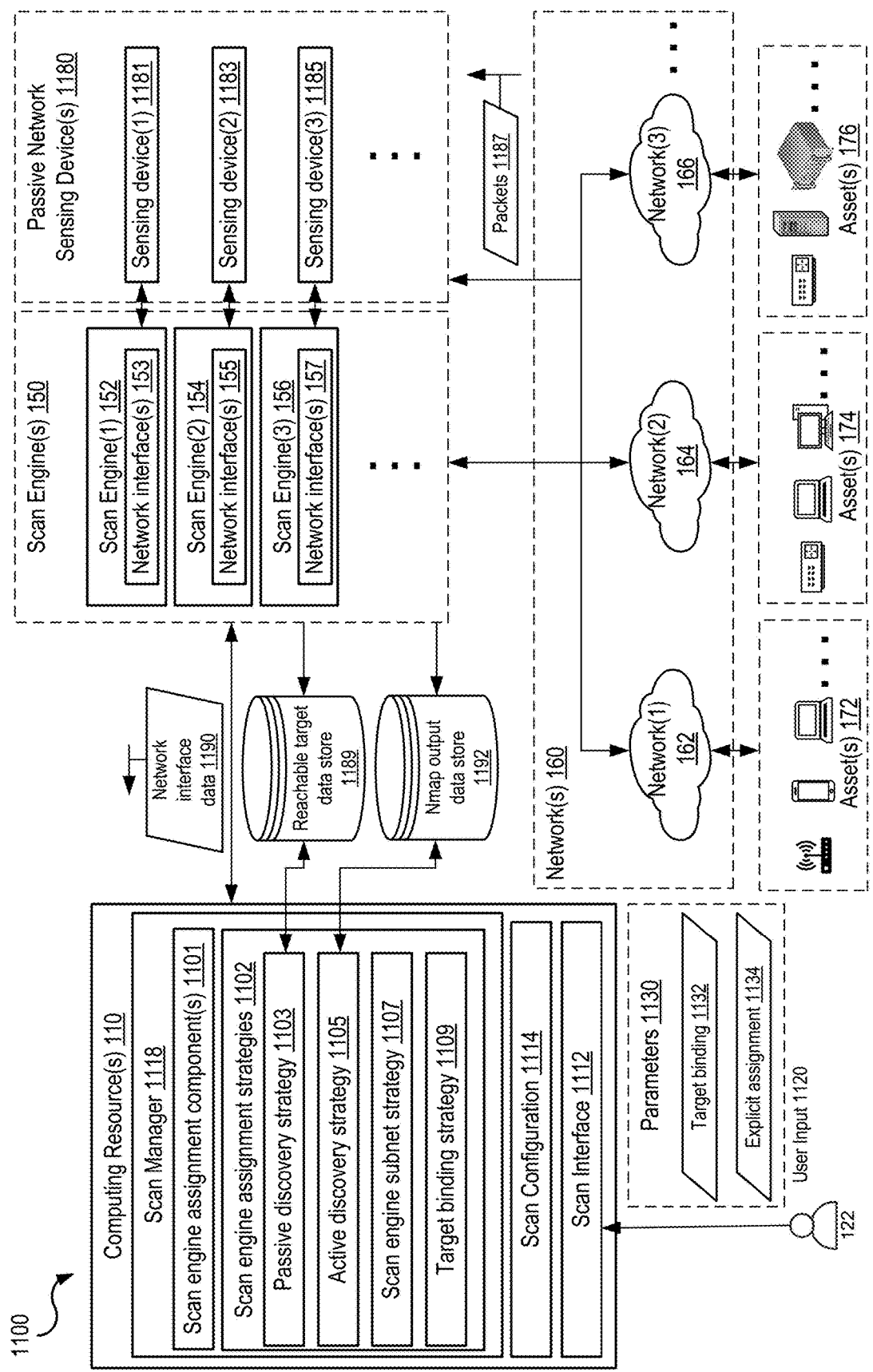
FIG. 11 is a block diagram illustrating an example system that implements automated scan engine assignment, according to some embodiments.

Referring to FIG. 11, a block diagram illustrates an example system 1100 that implements automated scan engine assignment, according to some embodiments.

In some embodiments, the example system 1100 depicted in FIG. 11 may include one or more components that are the same as or similar to one or more components of the system 100 illustrated and described herein with respect to FIG. 1. For example, FIG. 11 depicts one or more computing resources 110, which may include one or more hardware processors with associated memory (not shown, see e.g. FIG. 10). The computing resource(s) 110 may include one or more components that are configured to implement automated scan engine assignment, as described herein. In the embodiment depicted in FIG. 11, the computing resource(s) 110 include: one or more scan engine assignment components 1101; multiple scan engine assignment strategies 1102; a scan interface 1112, at least one scan configuration 1114, and a scan manager 1118. According to various embodiments, the scan interface 1112 may be configured to receive user input 1120 from the user 122. The scan interface 112 may correspond to an application programming interface (API) or a graphical user interface (GUI), according to some embodiments. For example, the scan interface 1112 may correspond to a platform scanning API, according to some embodiments.

According to various embodiments, the scan engine assignment component(s) 1101 may be configured to determine a particular scan engine assignment strategy for automatically assigning one or more of the scan engine(s) 150 to perform a scan, responsive to determining to initiate the scan of a particular target asset. FIG. 11 illustrates that each host that a scan engine runs on contains one or more network interfaces. When the scan engine sends metrics to the platform, the scan engine may submit network interface data 1190 that may include a list of network interfaces available on the system as well as the subnets for those interfaces. In the example depicted in FIG. 11, the one or more scan engines 150 include at least: a first scan engine 152, including one or more network interface 153; a second scan engine 154, including one or more network interface 155; and a third scan engine 156, including one or more network interface 157. It will be appreciated that an alternative number of scan engines may be utilized in alternative embodiments and that the example depicted in FIG. 11 is for illustrative purposes only.

To determine the scan engine assignment strategy, the scan engine assignment component(s) 1101 may be configured to implement a strategy selection scheme that defines a hierarchy of scan engine assignment strategies. FIG. 11 illustrates that the scan engine assignment strategies 1102 include at least a passive discovery strategy 1103, an active discovery strategy 1105, and a scan engine subnet strategy 1107. FIG. 11 illustrates that the scan engine assignment strategies 1102 may also include a target binding strategy 1109, according to some embodiments. Another strategy not illustrated in FIG. 11 corresponds to an explicit assignment strategy, as described herein. As illustrated and described further herein with respect to FIG. 12, the present disclosure contemplates engine assignment strategy precedence, in which a particular order may be followed when assigning targets to a given scan engine. According to some embodiments, the following order may be followed: (i) explicit assignment strategy (not shown in FIG. 11); (ii) the target binding strategy 1109; and (iii) the scan engine subnet strategy 1107. As illustrated and described further herein with respect to FIG. 13, there may be cases where a target is capable of being scanned by more than one scan engine. In such cases, various tie-breaker strategies may be employed in order for the scan engine assignment component(s) 1101 to determine which scan engine is to be assigned to scan a given target, according to some embodiments.

According to various embodiments, the scan engine assignment component(s) 1101 may be configured to automatically assign, using a particular scan engine assignment strategy of the scan engine assignment strategies 1102, the one or more scan engines to perform the scan. According to various embodiments, the scan manager 1118 may be configured to perform the scan using the one or more scan engines.

In the example depicted in FIG. 11, the user input 1120 includes various parameters 1130 that may be utilized to define various attributes of the scan configuration 1114. According to various embodiments, the parameters 1130 received as part of the user input 1120 may include one or more of: one or more target binding parameters 1132; and one or more explicit assignment parameters 1134. The target binding parameter(s) 1132 are further described herein with respect to various embodiments of the target binding strategy 1109. The explicit assignment parameters 1134 are further described herein with respect to an explicit assignment strategy (not shown in FIG. 11 as one of the scan engine assignment strategies 1102).

According to various embodiments, the passive discovery strategy 1103 may utilize reachable target data from passive network sensing devices 1180 associated with a plurality of scan engines (e.g., scan engines 152, 154, 156) to determine the one or more scan engines to perform the scan. With the passive discovery strategy 1103 (also referred to herein as a "network sensing strategy"), a passive network sensing device may be deployed alongside each scan engine. FIG. 11 illustrates one or more passive network sensing devices 1180 that may be deployed alongside the one or more scan engines 150. For example, FIG. 11 illustrates: a first passive network sensing device 1181 deployed alongside the first scan engine 152; a second passive network sensing device 1183 deployed alongside the second scan engine 154; and a third passive network sensing device 1185 deployed alongside the third scan engine 156. Each of these passive network sensing devices 1181, 1183, 1185 may capture packets 1187 and record the IP address and/or networks that those packets 1187 arrived from. Using this information, a reachable target data store 1189, representing a database of reachable targets, can be constructed over time and used to inform as to which targets a particular scan engine is capable of reaching. One advantage associated with the passive discovery strategy 1103 is that it does not rely on a user-initiated operation to begin collecting information. Rather, the packets 1187 are continuously collected and stored at the reachable target data store 1189. One disadvantage associated with the passive discovery strategy 1103 is that it does not guarantee that all possible targets are available in the reachable target data store 1189. Rather, the reachable target data store 1189 is constructed based on those targets or networks that are broadcast packets (or non-broadcast packets in the case of packet capture in promiscuous mode).

According to various embodiments, the active discovery strategy 1105 may utilize output data from the plurality of scan engines (e.g., scan engines 152, 154, 156) to determine the one or more scan engines to perform the scan. With the active discovery strategy 1105, the platform maintains an nmap output data store 1192 containing nmap output received from each of the scan engines 150 (e.g., scan engines 152, 154, 156). This nmap output may include information, such as: which hosts a scan engine is capable of reaching; what the latency is between the engine and hosts; and what ports are available to the engine, among other possibilities. Using this information, the platform may be able to determine not only which scan engines are capable of scanning a given target but also which scan engine is most satisfactorily equipped to scan that target. For example, there may be two scan engines that are both capable of reaching a particular target. However, one of those scan engines is within the target's local subnet, and one of those scan engines is not within the target's local subnet. As a result, the latency between the scan engine that is within the target's local subnet may be lower and the scan engine may be capable of scanning more ports. One disadvantage associated with the active discovery strategy 1105 is that it will not find non-responsive assets, such as a hardened computer or various IoT devices.

The active discovery strategy 1105 relies on data uploaded to the platform from previously executed nmap discovery scans from each of the scan engines 150 (e.g., scan engines 152, 154, 156). One advantage associated with the active discovery strategy 1105 is that it provides the highest guarantee of all strategies that the most satisfactorily equipped engine is selected to scan a particular target. Another advantage associated with the active discovery strategy 1105 is that it is capable of going beyond simple "reachability" when deciding which scan engine to utilize. That is, the active discovery strategy 1105 can also take into account port data. One disadvantage associated with the active discovery strategy 1105 is that it relies on information from nmap discovery scans previously performed by the scan engines 150.

According to various embodiments, the scan engine subnet strategy 1107 may utilize subnet data to determine which of the plurality of scan engines are capable of scanning the target asset. With the scan engine subnet strategy 1107 (also referred to herein as an "engine subnet strategy"), the scan configuration service utilizes the scan configuration 1114 that refers to the subnets that one or more scan engines are directly connected to in order to determine whether any of the scan engines are capable of scanning the given targets. The platform may store data related to all of the network interfaces (e.g., network interfaces 153, 155, 157) that are available on a given host machine where a given scan engine is installed. This data may include the subnets that a given scan engine is associated with. If a target falls within the range of a subnet that a particular scan engine is part of, then that particular scan engine may be assigned to scan the target. One advantage associated with the scan engine subnet strategy 1107 is that it does not require any manual intervention on the part of the user 122. One disadvantage associated with the scan engine subnet strategy 1107 is that using the subnet data may not guarantee that the engine is capable of actually scanning a particular target. Another disadvantage associated with the scan engine subnet strategy 1107 is resolving domain names, as the subnet data may only provide insights into IP-based targets (e.g., one or more IP addresses, ranges, CIDRs, etc.). That is, there may be no DNS-related data available as part of the subnet data.

According to various embodiments, the target binding strategy 1109 may involve the user 122 explicitly specifying the target asset(s) that a given scan engine is capable of scanning. With the target binding strategy 1109, the user 122 may be provided with a management API (e.g., as part of the scan interface 1112) that may provide the user 122 with the capability of assigning/binding target(s) to a given scan engine. Such information may be provided as target binding parameters 1132, as depicted in FIG. 11. When a scan is initiated via the platform, the scan configuration service may refer to the target bindings for all engines (which may be stored as part of the scan configuration 1114) to determine whether any of the engines match the target(s) specified in a start scan command. One or more scan engines that match the specified target(s) may be assigned to scan the given target(s). One advantage associated with the target binding strategy 1109 is that it provides customers with a tool to manage the mapping between scan engines and targets that a given engine is capable of scanning. Another advantage associated with the target binding strategy 1109 is that it is capable of supporting IP addresses, IP ranges, CIDRs, and hostnames. One disadvantage associated with the target binding strategy 1109 is that it still requires manual intervention on the part of the user 122. That is, a user is required to know beforehand which targets that a given scan engine is capable of scanning (i.e., prior network knowledge is required of the user 122), which may be provided by the user 122 as the target binding parameters 1132.

With the target binding strategy 1109, a target binding API (e.g., as part of the scan interface 1112) may provide support for target binding for a variety of targets. For example, for an IP address target type, the target binding strategy 1109 may map a specific IP address to a given scan engine. As another example, for an IP range target type, the target binding strategy 1109 may map a range of IP addresses to a given scan engine. As yet another example, for a CIDR target type, the target binding strategy 1109 may map a CIDR to a given scan engine. As a further example, for a domain name target type, the target binding strategy 1109 may map a domain name to a given scan engine, and any targets contained within the domain are scanned by the given scan engine.

According to various embodiments, an "explicit assignment strategy" (not shown as part of the scan engine assignment strategies 1102 depicted in FIG. 11) may be utilized. With this strategy, the user 122 may explicitly specify which scan engine to utilize as part of a scan. This information may be provided by the user 122 as explicit assignment parameters 1134, as depicted in the example of FIG. 11. This may correspond to a conventional strategy. Although this strategy is not an automated approach, the strategy is identified in the present disclosure to emphasize the fact that the user 122 is still provided the ability to override any automated scan engine selection. One advantage associated with such an explicit assignment strategy is that it provides the user 122 with the ability to disable the automated scan engine assignment by allowing the user 122 to explicitly specify which engines to utilize as part of a scan. One disadvantage associated with such a strategy is that it does not provide automated scan engine assignment.

Thus, the system 1100 depicted in FIG. 11 represents an example of a system that implements automated scan engine assignment, according to the present disclosure.

Referring to FIG. 12, a flowchart 1200 illustrates an example process of automated scan engine assignment, according to some embodiments. FIG. 12 illustrates that the present disclosure contemplates engine assignment strategy precedence, in which a particular order may be followed when assigning targets to a given scan engine. According to some embodiments, the following order may be followed: (i) explicit assignment strategy; (ii) target binding strategy; and (iii) scan engine subnet strategy. To illustrate, if a start scan command specifies a scan engine identifier (i.e., explicit assignment), then all targets may be assigned to that scan engine. It should be noted that the specification of more than one scan engine may not be supported using this strategy. Proceeding to the target binding strategy, the system of the present disclosure may evaluate each target against all target bindings for all engines. If the user specifies that a particular scan engine is to be utilized to scan a particular target asset, such a user preference is to be followed. Proceeding to the scan engine subnet strategy, using the network interface data for each engine, the system of the present disclosure may determine an appropriate engine to utilize based on the subnet masks available. As described herein, if a target fails to be assigned using the previously described strategies, the system of the present disclosure may employ a strategy of deferred assignment of a target and random selection of a scan engine, according to some embodiments. To illustrate, the assignment of a target may be deferred until after all other targets have been assigned. Once all other targets have been assigned to engines, the system of the present disclosure may randomly select an engine from the list of assigned engines and assign that engine to the deferred target (assuming at least one other target was assigned to that engine). If none of the above-described options allow for the assignment of a target to an engine, the automated assignment system of the present disclosure may fail the scan, according to some embodiments.

At operation 1210, the process includes determining whether a particular scan engine (associated with a particular scan engine identifier) is specified to perform a scan. For example, referring to FIG. 11, the scan engine assignment component(s) 1101 may determine whether the explicit assignment parameters 1134 have been received from the user 122 as part of the user input 122. The explicit assignment parameters 1134 may correspond to the user 122 explicitly specifying which scan engine to utilize as part of a scan. This may correspond to a conventional strategy. Although this strategy is not an automated approach, the strategy is identified in the present disclosure to emphasize the fact that users are still provided the ability to override any automated scan engine selection. One advantage associated with such an explicit assignment strategy is that it provides the user 122 with the ability to disable the automated scan engine assignment by allowing the user 122 to explicitly specify which engines to utilize as part of a scan. One disadvantage associated with such a strategy is that it does not provide automated scan engine assignment.

FIG. 12 illustrates that, at operation 1212, the process may proceed to either operation 1214 or operation 1220 responsive to a determination regarding whether a particular scan engine identifier is specified. That is, responsive to determining that the particular scan engine identifier is specified, the process may proceed to operation 1214. Responsive to determining that the particular scan engine identifier is not specified, the process may proceed to operation 1220.

At operation 1214, the process may include assigning the specified scan engine to perform the scan. For example, referring to FIG. 11, the scan engine assignment component(s) 1101 may assigned the specified scan engine to perform the scan.

At operation 1220, the process may include determining whether user input includes one or more target binding parameters specifying a particular scan engine to be utilized to scan a particular target asset. For example, referring to FIG. 11, the scan engine assignment component(s) 1101 may determine whether the target binding parameters 1132 have been received from the user 122 as part of the user input 1120. The target binding parameters 1132 may correspond to the user 122 explicitly specifying the target asset(s) that a given scan engine is capable of scanning.

With the target binding strategy 1109, the user 122 may be provided with a management API (e.g., as part of the scan interface 1112) that may provide the user 122 with the capability of assigning/binding target(s) to a given scan engine. Such information may be provided as target binding parameters 1132, as depicted in FIG. 11. When a scan is initiated via the platform, the scan configuration service may refer to the target bindings for all engines (which may be stored as part of the scan configuration 1114) to determine whether any of the engines match the target(s) specified in a start scan command. One or more scan engines that match the specified target(s) may be assigned to scan the given target(s). One advantage associated with the target binding strategy 1109 is that it provides customers with a tool to manage the mapping between scan engines and targets that a given engine is capable of scanning. Another advantage associated with the target binding strategy 1109 is that it is capable of supporting IP addresses, IP ranges, CIDRs, and hostnames. One disadvantage associated with the target binding strategy 1109 is that it still requires manual intervention on the part of the user 122. That is, a user is required to know beforehand which targets that a given scan engine is capable of scanning (i.e., prior network knowledge is required of the user), which may be provided by the user 122 as the target binding parameters 1132.

With the target binding strategy 1109, a target binding API (e.g., as part of the scan interface 1112) may provide support for target binding for a variety of targets. For example, for an IP address target type, the target binding strategy 1109 may map a specific IP address to a given scan engine. As another example, for an IP range target type, the target binding strategy 1109 may map a range of IP addresses to a given scan engine. As yet another example, for a CIDR target type, the target binding strategy 1109 may map a CIDR to a given scan engine. As a further example, for a domain name target type, the target binding strategy 1109 may map a domain name to a given scan engine, and any targets contained within the domain are scanned by the given scan engine.

FIG. 12 illustrates that, at operation 1222, the process may proceed to either operation 1224 or operation 1230 responsive to a determination regarding whether the user input includes target binding parameter(s) specifying a particular scan engine to be utilized to scan a particular target asset. That is, responsive to determining that the user input includes the target binding parameter(s), the process may proceed to operation 1224. Responsive to determining that the user input does not include the target binding parameter(s), the process may proceed to operation 1230.

At operation 1224, the process may include assigning the specified scan engine to perform the scan. For example, referring to FIG. 11, the scan engine assignment component(s) 1101 may assign the specified scan engine to perform the scan.

At operation 1230, the process may include utilizing network interface data for each scan engine to assign a particular scan engine to perform the scan of the particular target asset based on available subnet mask information. For example, referring to FIG. 11, the scan engine assignment component(s) 1101 may utilize the network interface data 1190 to assign a particular scan engine to perform the scan of the particular target asset based on available subnet mask information.

At operation 1232, the process includes determining whether there was a target assignment failure. If there was not a target assignment failure, the process may proceed to operation 1234. If there was a target assignment failure, the process may proceed to operation 1236.

At operation 1234, the process may include assigning the specified scan engine to perform the scan. For example, referring to FIG. 11, the scan engine assignment component(s) 1101 may assign the specified scan engine to perform the scan.

At operation 1236, the process may include deferring assignment and randomly selecting a scan engine to perform the scan. For example, referring to FIG. 11, the scan engine assignment component(s) 1101 may defer assignment and randomly select a scan engine to perform the scan At operation 1240, the process includes determining whether there was a scan engine assignment failure. If there was a scan engine assignment failure, the process may proceed to operation 1242, which includes failing the scan. If there was not a scan engine assignment failure, the process may proceed to operation 1244.

At operation 1244, the process may include assigning the randomly selected scan engine to perform the scan. For example, referring to FIG. 11, the scan engine assignment component(s) 1101 may assign the randomly selected scan engine to perform the scan.

Thus, FIG. 12 illustrates an example process of automated scan engine assignment, according to some embodiments. FIG. 12 illustrates that the present disclosure contemplates engine assignment strategy precedence, in which a particular order may be followed when assigning targets to a given scan engine.

Referring to FIG. 13, a flowchart 1300 illustrates an example process of automated scan engine assignment, according to some embodiments. FIG. 13 illustrates that there may be cases where a target is capable of being scanned by more than one scan engine. In such cases, various tie-breaker strategies may be employed in order to determine which scan engine is to be assigned to scan a given target, according to some embodiments. As described herein, the various tie-breaker strategies may include: (i) a naïve strategy; (ii) a metrics-driven strategy; (iii) a fewest engines strategy; and (iv) a most engines strategy.

At operation 1310, the process includes, responsive to determining to initiate a scan of a target asset, determining a scan engine assignment strategy for automatically assigning one or more scan engines to perform the scan. Determining the scan engine assignment strategy includes implementing a strategy selection scheme that defines a hierarchy of scan engine assignment strategies. For example, referring to FIG. 11, the scan engine assignment component(s) 1101 may determine a particular scan engine assignment strategy from the scan engine assignment strategies 1102 for automatically assigning one or more scan engines to perform the scan. As described herein, to determine the scan engine assignment strategy, the scan engine assignment component(s) 1101 may implement a strategy selection scheme that defines a hierarchy of scan engine assignment strategies.

At operation 1320, the process includes determining whether the target asset is capable of being scanned by more than one scan engine. For example, referring to FIG. 11, each of these passive network sensing devices 1181, 1183, 1185 (associated with scan engines 152, 154, 156, respectively) may capture the packets 1187 and record the IP address and/or networks that those packets 1187 arrived from (including broadcast packets or non-broadcast packets in the case of packet capture in promiscuous mode). Using this information, the reachable target data store 1189, representing a database of reachable targets, can be constructed over time and used to inform as to which targets a particular scan engine is capable of reaching. According to various embodiments, the information stored at the reachable target data store 1189 may be utilized to determine whether the target asset is capable of being scanned by more than one scan engine.

FIG. 13 illustrates that, at operation 1322, the process may proceed to either operation 1324 or operation 1326 responsive to a determination regarding whether there is multiple scan engine capability. That is, responsive to determining that the target asset is not capable of being scanned by more than one scan engine, the process may proceed to operation 1324. Responsive to determining that the target asset is capable of being scanned by more than one scan engine, the process may proceed to operation 1326.

At operation 1324, the process may include automatically assigning, using the scan engine assignment strategy, a single scan engine to perform the scan. For example, referring to FIG. 11, the scan engine assignment component(s) 1101 may assign, using a particular scan engine assignment strategy of the scan engine assignment strategies 1102, a single scan engine (e.g., one of the scan engines 152, 154, 156) to perform the scan. Subsequently, the process may proceed to operation 1330 to perform the scan using the single assigned scan engine (e.g., one of the scan engines 152, 154, 156 depicted in FIG. 11).

At operation 1326, the process may include implementing a tie-breaker strategy to select one or more scan engines to assign to perform the scan. For example, referring to FIG. 11, the scan engine assignment component(s) 1101 may implement a tie-breaker strategy to select one or more scan engines (e.g., one or more of the scan engines 152, 154, 156) to assign to perform the scan. FIG. 13 illustrates, at operation 1328, that implementing the tie-breaker strategy may include selecting at least one of: (i) a naïve strategy; (ii) a metrics-driven strategy; (iii) a fewest engines strategy; and (iv) a most engines strategy. FIG. 13 illustrates that the fewest engines strategy may include a fewer engines strategy or a guaranteed fewest engines strategy, as described herein. Subsequently, the process may proceed to operation 1330.

With regard to the "naïve" tie-breaker strategy, such a strategy may iterate a list of platform-enabled scan engines and select the first engine that is capable of scanning the target. It should be noted that, with this approach, there is the potential for a scan to be distributed across more scan engines than required to complete the scan.

With regard to the "metrics-driven" tie-breaker strategy, in cases where multiple engines are capable of scanning a given target, metrics data related to the scan engine can be used to determine which scan engine to utilize. There may be various metrics that may be utilized to influence which engine is used to scan a given target, according to some embodiments. To illustrate, non-limiting examples of such metrics may include: (i) latency between engine and target; (ii) average latency between engine and network; (iii) current engine resource utilization; and (iv) estimated engine resource utilization.

Regarding the metric of latency between engine and target, the system of the present disclosure may be configured to evaluate the network latency (i.e., RTT) between the scan engine and the target. Whether this metric may be utilized depends on the availability of historical latency data between the engine and the target. Regarding the metric of average latency between engine and network, the system of the present disclosure may be configured to examine the average latency (RTT) between the scan engine and the targets on the network. Whether this metric may be utilized depends on the availability of historical average latency data between the scan engine and the rest of the network. Regarding the metric of current engine resource utilization, the system of the present disclosure may be configured to examine current (real-time) resource utilization of a given engine. By comparing resource utilization between scan engines, targets may be assigned to those engines with enough available resources. Regarding the metric of estimated engine resource utilization (related to the "current" engine resource utilization), the system of the present disclosure may be configured to estimate resource utilization of a given scan engine based on the number of targets that have been assigned to the engine for a given scan but that have not yet been submitted to the engine for scanning.

With regard to the "fewest engines" tie-breaker strategy, such a strategy may be useful in cases where it is advantageous to reduce the number of scan engines to be utilized as part of a scan (e.g., to a "minimum" number of scan engines). This strategy may iterate over all targets and identify the "minimum" set of engines that are capable of scanning the entire set of targets. According to some embodiments, the "fewest engines" strategy may include either a "fewer" engines strategy or a "guaranteed fewest engines" strategy.

With respect to the "fewer engines" strategy, the system of the present disclosure may be configured to determine whether an engine has already been identified as being capable of scanning a given target. In such cases, this approach may determine whether that engine is capable of scanning any of the other targets before iterating over the complete list of scan engines. This approach may be advantageous compared to the naïve strategy in terms of the number of engines to be utilized as part of the scan. However, this approach may not guarantee that the fewest number of engines is utilized as part of the scan. For example, there may be a scenario where the goal is to scan five targets and there are three platform-enabled engines (referred to as ENGINE_A, ENGINE_B, and ENGINE_C for this scenario, which may correspond to the three scan engines 152, 154, 156 depicted in FIG. 11). The system may determine that ENGINE_A is capable of scanning the first four targets but is not capable of scanning the fifth target. According to some embodiments, this approach may then involve iterating the list of engines to determine that ENGINE_B is capable of scanning the fifth target. In this example, the scan would utilize ENGINE_A (i.e., to scan the first four targets) as well as ENGINE_B (i.e., to scan the fifth target). However, ENGINE_C may have been capable of scanning all five targets, thereby reducing the number of scan engines involved in scanning to target to a single engine.

With respect to the "guaranteed fewest engines" strategy, the system of the present disclosure may be configured to identify a list of all engines that are capable of scanning a given target. The result may be a map of engines [target]. The system may then evaluate the list of engines and determine which engine is capable of scanning the largest number of targets. The system may then remove those targets from the map and re-evaluate the map to identify the particular engine that is capable of scanning the largest number of remaining targets. This process may be repeated until all targets have been assigned to a scan engine. One disadvantage associated with this approach is that, in the case of a large number of targets or a large number of engines, assignment may potentially be CPU-intensive and/or time-consuming.

With respect to the "most engines" strategy, such a strategy may be useful in cases where it is advantageous to maximize the number of engines to be utilized as part of the scan. For this strategy, the algorithm may iterate over all targets to ensure a balanced distribution of targets across all engines. Any engines without targets associated with them may be assumed to be incapable of scanning any of the targets.

At operation 1330, the process includes performing the scan using the one or more assigned scan engines. For example, referring to FIG. 11, the scan manager 1118 may perform the scan using the one or more assigned scan engines (e.g., one or more of the scan engines 152, 154, 156).

Thus, FIG. 13 illustrates an example process of automated scan engine assignment, according to some embodiments. FIG. 13 illustrates that there may be cases where a target is capable of being scanned by more than one scan engine. In such cases, various tie-breaker strategies may be employed in order to determine which scan engine is to be assigned to scan a given target, according to some embodiments.

Referring to FIG. 14, a flowchart 1400 illustrates an example process of automated scan engine assignment, according to some embodiments.

At operation 1410, the process includes, responsive to determining to initiate a scan of a target asset, determining a scan engine assignment strategy for automatically assigning one or more scan engines to perform the scan. Determining the scan engine assignment strategy may include implementing a strategy selection scheme that defines a hierarchy of scan engine assignment strategies. For example, referring to FIG. 11, the scan engine assignment component(s) 1101 may determine a particular scan engine assignment strategy (of the scan engine assignment strategies 1102) for automatically assigning one or more scan engines (e.g., one or more of the scan engines 152, 154, 156) to perform the scan. As described herein, the scan engine assignment component(s) 1101 may determine the particular scan engine assignment strategy by implementing a strategy selection scheme that defines a hierarchy of scan engine assignment strategies.

FIG. 14 illustrates, at operation 1412, that various scan engine assignment strategies may be utilized, according to various embodiments. The scan engine assignment strategies may include at least one of: (i) a passive discovery strategy; (ii) an active discovery strategy; and (iii) a scan engine subnet strategy. The passive discovery strategy utilizes reachable target data from passive network sensing devices associated with a plurality of scan engines to determine the scan engine(s) to perform the scan, as described herein. The active discovery strategy utilizes output data from the plurality of scan engines to determine the scan engine(s) to perform the scan, as described herein. The scan engine subnet strategy utilizes subnet data to determine which of a plurality of scan engines are capable of scanning the target asset, as described herein. For example, referring to FIG. 11, the scan engine assignment strategies 1102 include at least: the passive discovery strategy 1103; the active discovery strategy 1105; and the scan engine subnet strategy 1107.

At operation 1420, the process includes automatically assigning, using the scan engine assignment strategy, the scan engine(s) to perform the scan. For example, referring to FIG. 11, the scan engine assignment component(s) 1101 may automatically assign one or more scan engines (e.g., one or more of the scan engines 152, 154, 156) to perform the scan.

At operation 1430, the process includes performing the scan using the one or more assigned scan engines. For example, referring to FIG. 11, the scan manager 1118 may perform the scan using the one or more assigned scan engines (e.g., one or more of the scan engines 152, 154, 156).

Thus, FIG. 14 illustrates an example process of automated scan engine assignment, according to some embodiments.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A system, comprising:
one or more hardware processors with associated memory that implement automated scan engine assignment, wherein the one or more hardware processors are configured to:
responsive to determining to initiate a scan of a target asset, determine a scan engine assignment strategy for automatically assigning one or more scan engines to perform the scan, wherein, to determine the scan engine assignment strategy, the one or more hardware processors are configured to implement a strategy selection scheme that selects the scan engine assignment strategy from a hierarchy of scan engine assignment strategies according to a following descending order of precedence:
(i) an explicit assignment strategy that utilizes one or more user-specified explicit assignment parameters to determine a particular scan engine of the plurality of scan engines to perform the scan,
(ii) a target binding strategy that utilizes one or more user-specified target binding parameters to determine a particular scan engine of the plurality of scan engines to perform the scan,
(iii) a passive discovery strategy that utilizes reachable target data from a plurality of scan engines to determine the one or more scan engines to perform the scan,
(iv) an active discovery strategy that utilizes output data from the plurality of scan engines to determine the one or more scan engines to perform the scan,
(v) a scan engine subnet strategy that utilizes subnet data to determine which of the plurality of scan engines are capable of scanning the target asset, and
(vi) a random selection strategy that utilizes a random engine assignment scheme to determine the one or more scan engines to perform the scan;
automatically assign, using the scan engine assignment strategy, the one or more scan engines to perform the scan; and
perform the scan using the one or more scan engines.

2. The system of claim 1, wherein the scan engine assignment strategy is selected based on one or more parameters of a user scan command.

3. The system of claim 2, wherein the one or more parameters specify one or more user preferences that overrides the strategy selection scheme.

4. The system of claim 1, wherein the one or more hardware processors are further configured to:
determine that the target asset is capable of being scanned by more than one scan engine; and
implement a tie-breaker strategy to select the one or more scan engines to assign to perform the scan.

5. The system of claim 4, wherein the tie-breaker strategy is selected from a plurality of tie-breaker strategies including:
a naïve strategy that iterates through a list of the plurality of scan engines to select a first scan engine that is capable of scanning the target asset,
a metrics-driven strategy that utilizes metrics associated with each of the plurality of scan engines to select a particular scan engine of multiple scan engines that are capable of scanning the target asset,
a fewest engines strategy that identifies a minimum number of scan engines from multiple scan engines that are capable of scanning the target asset, and
a most engines strategy that identifies a maximum number of scan engines from multiple scan engines that are capable of scanning the target asset.

6. The system of claim 5, wherein the fewest engines strategy comprises one of: a fewer engines strategy; or a guaranteed fewest engines strategy.

7. The system of claim 1, wherein the one or more hardware processors are configured to initiate the scan of the target asset responsive to receiving a start scan command.

8. The system of claim 1, wherein the target asset comprises an asset that is targeted for the scan, the asset comprising:
a single internet protocol (IP) address;
a range of IP addresses;
a classless inter-domain routing (CIDR) value; or
a top-level domain (TLD) name.

9. The system of claim 1, wherein the passive discovery strategy utilizes the reachable target data stored in a reachable target data store to determine the one or more scan engines to perform the scan, wherein the reachable target data is obtained from passive network sensing devices.

10. The system of claim 1, wherein the active discovery strategy utilizes the output data stored at an nmap output data store to determine the one or more scan engines to perform the scan, and wherein:
the output data include nmap output obtained from each scan engine of the plurality of scan engines; and
the nmap output includes information related to at least one of:
one or more hosts that a particular scan engine is capable of reaching;
latency between the particular scan engine and the one or more hosts; and
one or more ports that are accessible to the particular scan engine.

11. The system of claim 1, wherein the scan engine subnet strategy:
utilizes a scan configuration service that obtains the subnet data based on subnets associated with individual scan engines of the plurality of scan engines; and
determines whether an internet protocol (IP) address associated with the target asset is within a range of IP addresses associated with a particular subnet associated with a particular scan engine;
wherein the particular scan engine is automatically assigned to perform the scan of the target asset responsive to determining that the IP address associated with the target asset is within the range of IP addresses.

12. A method comprising:
implementing, using one or more hardware processors, automated scan engine assignment, wherein the implementing comprises:
responsive to determining to initiate a scan of a target asset, determining a scan engine assignment strategy for automatically assigning one or more scan engines to perform the scan, wherein determining the scan engine assignment strategy includes implementing a strategy selection scheme that selects the scan engine assignment strategy from a hierarchy of scan engine assignment strategies according to a following descending order of precedence:
(i) an explicit assignment strategy that utilizes one or more user-specified explicit assignment parameters to determine a particular scan engine of the plurality of scan engines to perform the scan,
(ii) a target binding strategy that utilizes one or more user-specified target binding parameters to determine a particular scan engine of the plurality of scan engines to perform the scan,
(iii) a passive discovery strategy that utilizes reachable target data from a plurality of scan engines to determine the one or more scan engines to perform the scan,
(iv) an active discovery strategy that utilizes output data from the plurality of scan engines to determine the one or more scan engines to perform the scan,
(v) a scan engine subnet strategy that utilizes subnet data to determine which of the plurality of scan engines are capable of scanning the target asset, and
(vi) a random selection strategy that utilizes a random engine assignment scheme to determine the one or more scan engines to perform the scan;
automatically assigning, using the scan engine assignment strategy, the one or more scan engines to perform the scan; and performing the scan using the one or more scan engines.

13. The method of claim 12, wherein the scan engine assignment strategy is selected based on one or more parameters of a user scan command.

14. The method of claim 13, wherein the one or more parameters specify one or more user preferences that overrides the strategy selection scheme.

15. The method of claim 12, wherein the implementing further comprises:
   determining that the target asset is capable of being scanned by more than one scan engine; and
   implementing a tie-breaker strategy to select the one or more scan engines to assign to perform the scan.

16. The method of claim 15, wherein the tie-breaker strategy is selected from a plurality of tie-breaker strategies including:
   a naïve strategy that iterates through a list of the plurality of scan engines to select a first scan engine that is capable of scanning the target asset,
   a metrics-driven strategy that utilizes metrics associated with each of the plurality of scan engines to select a particular scan engine of multiple scan engines that are capable of scanning the target asset,
   a fewest engines strategy that identifies a minimum number of scan engines from multiple scan engines that are capable of scanning the target asset, and
   a most engines strategy that identifies a maximum number of scan engines from multiple scan engines that are capable of scanning the target asset.

17. The method of claim 16, wherein the fewest engines strategy comprises one of: a fewer engines strategy; or a guaranteed fewest engines strategy.

18. One or more non-transitory computer-accessible storage media storing program instructions that, when executed on or across one or more processors, implement at least a portion of a system that implements automated scan engine assignment and cause the system to:
   responsive to determining to initiate a scan of a target asset, determine a scan engine assignment strategy for automatically assigning one or more scan engines to perform the scan, wherein, to determine the scan engine assignment strategy, the one or more hardware processors are configured to implement a strategy selection scheme that selects the scan engine assignment strategy from a hierarchy of scan engine assignment strategies according to a following descending order of precedence:
   (i) an explicit assignment strategy that utilizes one or more user-specified explicit assignment parameters to determine a particular scan engine of the plurality of scan engines to perform the scan,
   (ii) a target binding strategy that utilizes one or more user-specified target binding parameters to determine a particular scan engine of the plurality of scan engines to perform the scan,
   (iii) a passive discovery strategy that utilizes reachable target data from a plurality of scan engines to determine the one or more scan engines to perform the scan,
   (iv) an active discovery strategy that utilizes output data from the plurality of scan engines to determine the one or more scan engines to perform the scan,
   (v) a scan engine subnet strategy that utilizes subnet data to determine which of the plurality of scan engines are capable of scanning the target asset, and
   (vi) a random selection strategy that utilizes a random engine assignment scheme to determine the one or more scan engines to perform the scan;
   automatically assign, using the scan engine assignment strategy, the one or more scan engines to perform the scan; and
   perform the scan using the one or more scan engines.

19. The one or more non-transitory computer-accessible storage media of claim 18, wherein:
   the scan engine assignment strategy is selected based on one or more parameters of a user scan command.

20. The one or more non-transitory computer-accessible storage media of claim 18, wherein the instructions, when executed on or across the one or more processors, further cause the system to:
   determine that the target asset is capable of being scanned by more than one scan engine; and
   implement a tie-breaker strategy to select the one or more scan engines to assign to perform the scan, wherein the tie-breaker strategy comprises at least one of:
      a naïve strategy that iterates through a list of the plurality of scan engines to select a first scan engine that is capable of scanning the target asset;
      a metrics-driven strategy that utilizes metrics associated with each of the plurality of scan engines to select a particular scan engine of multiple scan engines that are capable of scanning the target asset;
      a fewest engines strategy that identifies a minimum number of scan engines from multiple scan engines that are capable of scanning the target asset; or
      a most engines strategy that identifies a maximum number of scan engines from multiple scan engines that are capable of scanning the target asset.

* * * * *